(12) United States Patent
Iwata et al.

(10) Patent No.: US 10,205,255 B2
(45) Date of Patent: Feb. 12, 2019

(54) BATTERY TERMINAL STOPPER AND BATTERY TERMINAL UNIT

(71) Applicants: Yazaki Corporation, Minato-ku, Tokyo (JP); TOYOTA JIDOSHA KABUSHIKI KAISHA, Toyota-shi, Aichi-ken (JP)

(72) Inventors: Masao Iwata, Susono (JP); Takahiro Shiohama, Susono (JP); Takaaki Yanagihashi, Toyota (JP); Hiroki Kawakami, Okazaki (JP)

(73) Assignees: YAZAKI CORPORATION, Minato-Ku, Tokyo (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 0 days.

(21) Appl. No.: 15/254,165

(22) Filed: Sep. 1, 2016

(65) Prior Publication Data
US 2016/0372847 A1   Dec. 22, 2016

Related U.S. Application Data

(63) Continuation of application No. 14/543,795, filed on Nov. 17, 2014, now abandoned.

(30) Foreign Application Priority Data

Dec. 19, 2013 (JP) ................................ 2013-262605

(51) Int. Cl.
*H01R 11/28* (2006.01)
(52) U.S. Cl.
CPC ......... *H01R 11/285* (2013.01); *H01R 11/284* (2013.01); *H01R 11/287* (2013.01)

(58) Field of Classification Search
CPC ... H01R 11/284; H01R 11/285; H01R 11/287; H01H 2085/025; H01H 2231/026
See application file for complete search history.

(56) References Cited

U.S. PATENT DOCUMENTS

| 6,398,595 B2 * | 6/2002 | Wakata | ................ | H01R 11/282 429/1 |
| 6,533,619 B2 * | 3/2003 | Wakata | ................ | H01R 13/642 439/202 |

(Continued)

FOREIGN PATENT DOCUMENTS

| CN | 101855783 A | 10/2010 |
| EP | 0 685 903 A2 | 12/1995 |

(Continued)

OTHER PUBLICATIONS

Notification of the First Office Action of Chinese Patent Application No. 201410659882.2, dated Sep. 28, 2016 (13 pages including translation).

(Continued)

*Primary Examiner* — Edwin A. Leon
*Assistant Examiner* — Oscar C Jimenez
(74) *Attorney, Agent, or Firm* — Finnegan, Henderson, Farabow, Garrett & Dunner LLP

(57) ABSTRACT

A battery terminal unit includes a battery terminal that is assembled on a battery post and also includes a battery terminal stopper. The battery terminal stopper includes a first rotation preventing portion that abuts against a first abutment surface formed on a side surface of a battery housing in a state where the battery terminal is assembled on the battery post so as to be able to restrict rotation of the battery terminal about the battery post as the rotating center. The battery terminal stopper also includes a second rotation preventing portion that abuts against a second abutment surface formed on the battery housing along a direction (Continued)

intersecting with the first abutment surface in the assembled state so as to be able to restrict rotation of the battery terminal about the battery post as the rotating center.

10 Claims, 16 Drawing Sheets

(56) References Cited

U.S. PATENT DOCUMENTS

| | | | |
|---|---|---|---|
| 6,576,838 B2* | 6/2003 | Matsumura | H01H 85/044 174/135 |
| 6,869,310 B2* | 3/2005 | Fukuda | H01R 11/282 439/522 |
| 7,176,780 B2* | 2/2007 | Iwata | H01H 85/044 337/161 |
| 7,663,466 B1 | 2/2010 | Jetton | |
| 7,695,326 B1* | 4/2010 | Freitag | H01R 11/282 439/772 |
| 7,978,046 B2* | 7/2011 | Ohashi | H01H 85/044 337/186 |
| 7,990,738 B2* | 8/2011 | Urrea | H01H 85/12 361/833 |
| 8,147,280 B2* | 4/2012 | Fernandez | H01M 10/48 439/754 |
| 2001/0024909 A1 | 9/2001 | Wakata et al. | |
| 2001/0027063 A1 | 10/2001 | Wakata et al. | |
| 2002/0134572 A1* | 9/2002 | Matsumura | H01H 85/044 174/66 |
| 2003/0064634 A1 | 4/2003 | Fukuda | |
| 2005/0116806 A1 | 6/2005 | Iwata | |
| 2009/0108981 A1* | 4/2009 | Iwata | G01R 1/0408 337/186 |
| 2009/0108982 A1 | 4/2009 | Ohashi et al. | |
| 2009/0251200 A1* | 10/2009 | Urrea | H01H 85/12 327/525 |
| 2011/0076888 A1 | 3/2011 | Fernandez et al. | |
| 2014/0183310 A1* | 7/2014 | Shimizu | B60R 16/0238 248/205.1 |
| 2016/0126529 A1* | 5/2016 | Matsumoto | H01M 2/30 429/121 |
| 2016/0196947 A1* | 7/2016 | Matsumoto | H01H 85/20 337/207 |
| 2017/0278662 A1* | 9/2017 | Kitano | H01H 85/0241 |
| 2017/0345601 A1* | 11/2017 | Kitano | H01H 85/0241 |

FOREIGN PATENT DOCUMENTS

| | | |
|---|---|---|
| JP | 57-173268 U | 1/1982 |
| JP | 2001-257016 A | 9/2001 |
| JP | 2002-270082 A | 9/2002 |
| JP | 2003-115291 A | 4/2003 |
| JP | 2005-135791 A | 5/2005 |
| JP | 2009-110843 A | 5/2009 |
| JP | 2010-40258 | 2/2010 |
| JP | 2010-061813 A | 3/2010 |
| JP | 2011-134519 | 7/2011 |
| JP | 2011-181191 | 9/2011 |
| WO | WO 2008/151181 A1 | 12/2008 |
| WO | WO 2011/083862 A1 | 7/2011 |

OTHER PUBLICATIONS

French Preliminary Search Report issued by the National Industrial Property Institute (INPI) on May 3, 2017 in corresponding French Patent Application No. 1461146 (6 pages).

Office Action issued by the Japanese Patent Office dated Sep. 26, 2017 in counterpart Japanese Patent Application No. 2013-262605, and English translation thereof.

* cited by examiner

BATTERY TERMINAL STOPPER AND BATTERY TERMINAL UNIT

CROSS-REFERENCE TO RELATED APPLICATIONS

This is a continuation of application Ser. No. 14/543,795, filed Nov. 17, 2014, which is based on and claims benefit of Japanese Patent Application No. 2013-262605 filed in Japan on Dec. 19, 2013, all of which are incorporated herein by reference.

BACKGROUND OF THE INVENTION

1. Field of the Invention

The present invention relates to a battery terminal stopper and a battery terminal unit.

2. Description of the Related Art

As a conventional battery terminal stopper and battery terminal unit, for example, Japanese Patent Application Laid-open No. 2010-40258 discloses a battery terminal unit including a battery terminal that is connected to a battery post provided upright on a battery and a rotational movement restricting member that is attached to the battery terminal and is made of a synthetic resin. The rotational movement restricting member of the battery terminal unit has a configuration in which it abuts against the battery in a state where the battery terminal is connected to the battery post so as to restrict an assembled angle of the battery terminal with respect to the battery post.

The battery terminal unit as described in Japanese Patent Application Laid-open No. 2010-40258 has been desired to be further improved in assembling accuracy of the battery terminal on the battery post in consideration of a space for mounting the battery, for example.

The present invention has been made in view of the above-mentioned circumferences and an object thereof is to provide a battery terminal stopper and a battery terminal unit that can improve assembling accuracy of a battery terminal on a battery post.

SUMMARY OF THE INVENTION

It is an object of the present invention to at least partially solve the problems in the conventional technology.

According to one aspect of the present invention, a battery terminal stopper includes an attachment portion capable of being attached to a battery terminal that is assembled on a battery post provided on a battery housing; a first rotation preventing portion configured to be provided on the attachment portion, oppose a first abutment surface formed on a side surface of the battery housing, and abut against the first abutment surface in a state where the battery terminal is assembled on the battery post together with the attachment portion so as to be able to restrict rotation of the battery terminal about the battery post as a rotating center; and a second rotation preventing portion configured to be provided on the attachment portion, oppose a second abutment surface formed on the battery housing along a direction intersecting with the first abutment surface, and abut against the second abutment surface in the state where the battery terminal is assembled on the battery post together with the attachment portion so as to be able to restrict rotation of the battery terminal about the battery post as the rotating center.

According to another aspect of the present invention, the second abutment surface is formed on a wall surface of a recess that is formed on a post stand surface provided with the battery post and on which the battery post is provided upright in the battery housing, the wall surface being orthogonal to the side surface of the battery housing on which the first abutment surface is formed.

According to still another aspect of the present invention, the second abutment surface is formed on a side surface of the battery housing that is orthogonal to the side surface of the battery housing on which the first abutment surface is formed.

According to still another aspect of the present invention, the first rotation preventing portion and the second rotation preventing portion are formed integrally with the attachment portion, and the attachment portion is interposed between the battery terminal and the battery housing in a state where the battery terminal is assembled on the battery post together with the attachment portion.

According to still another aspect of the present invention, a battery terminal unit includes a battery terminal configured to be assembled on a battery post provided on a battery housing; and a battery terminal stopper configured to include an attachment portion capable of being attached to the battery terminal, a first rotation preventing portion that is provided on the attachment portion, opposes a first abutment surface formed on a side surface of the battery housing and abuts against the first abutment surface in a state where the battery terminal is assembled on the battery post together with the attachment portion so as to be able to restrict rotation of the battery terminal about the battery post as a rotating center, and a second rotation preventing portion that is provided on the attachment portion, opposes a second abutment surface formed on the battery housing along a direction intersecting with the first abutment surface and abuts against the second abutment surface in the state where the battery terminal is assembled on the battery post together with the attachment portion so as to be able to restrict rotation of the battery terminal about the battery post as the rotating center.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments according to the present invention will be described in detail with reference to the accompanying drawings. The embodiments do not limit the invention. The constituent components in the following embodiments include constituent components that can be replaced by those skilled in the art or are substantially the same.

First Embodiment

Figure 1:
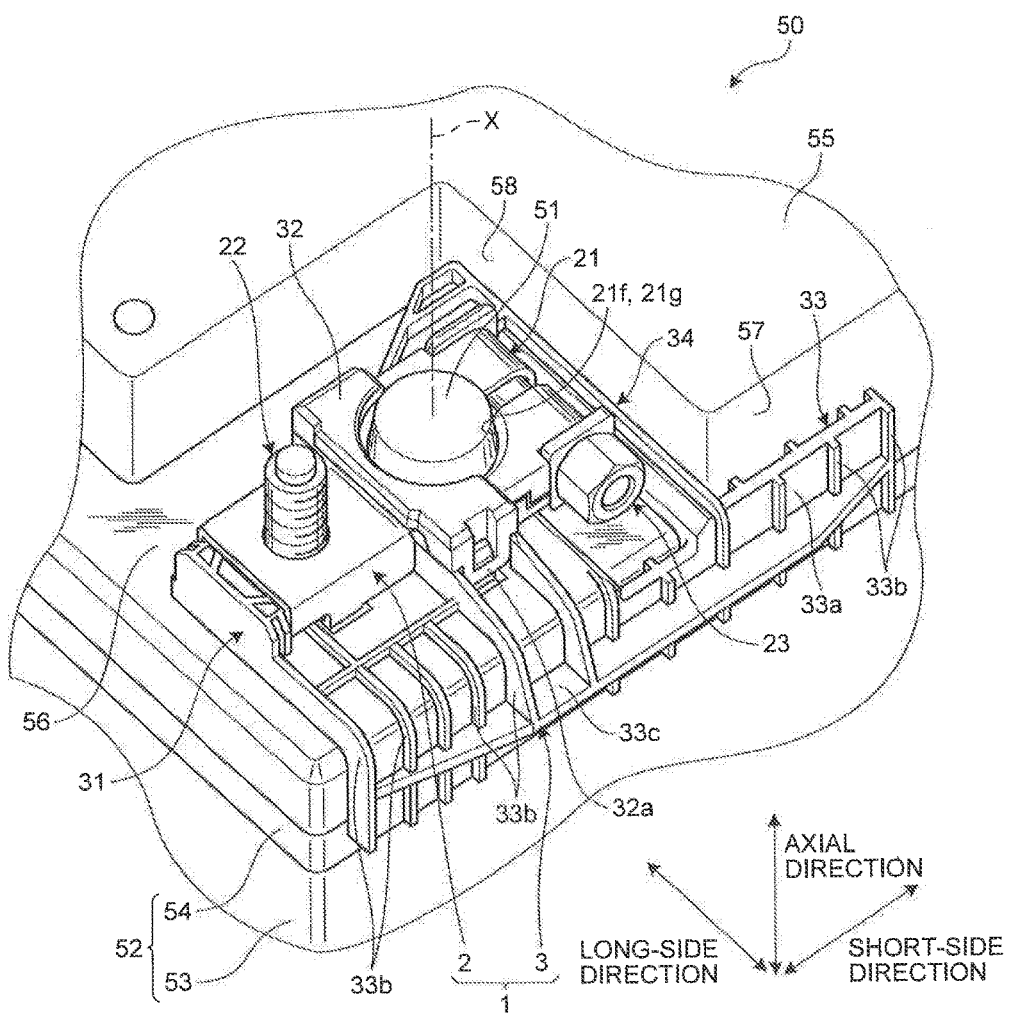
FIG. 1 is a partial perspective view illustrating the schematic configuration of a battery terminal unit according to a first embodiment of the present invention.
Figure 2:
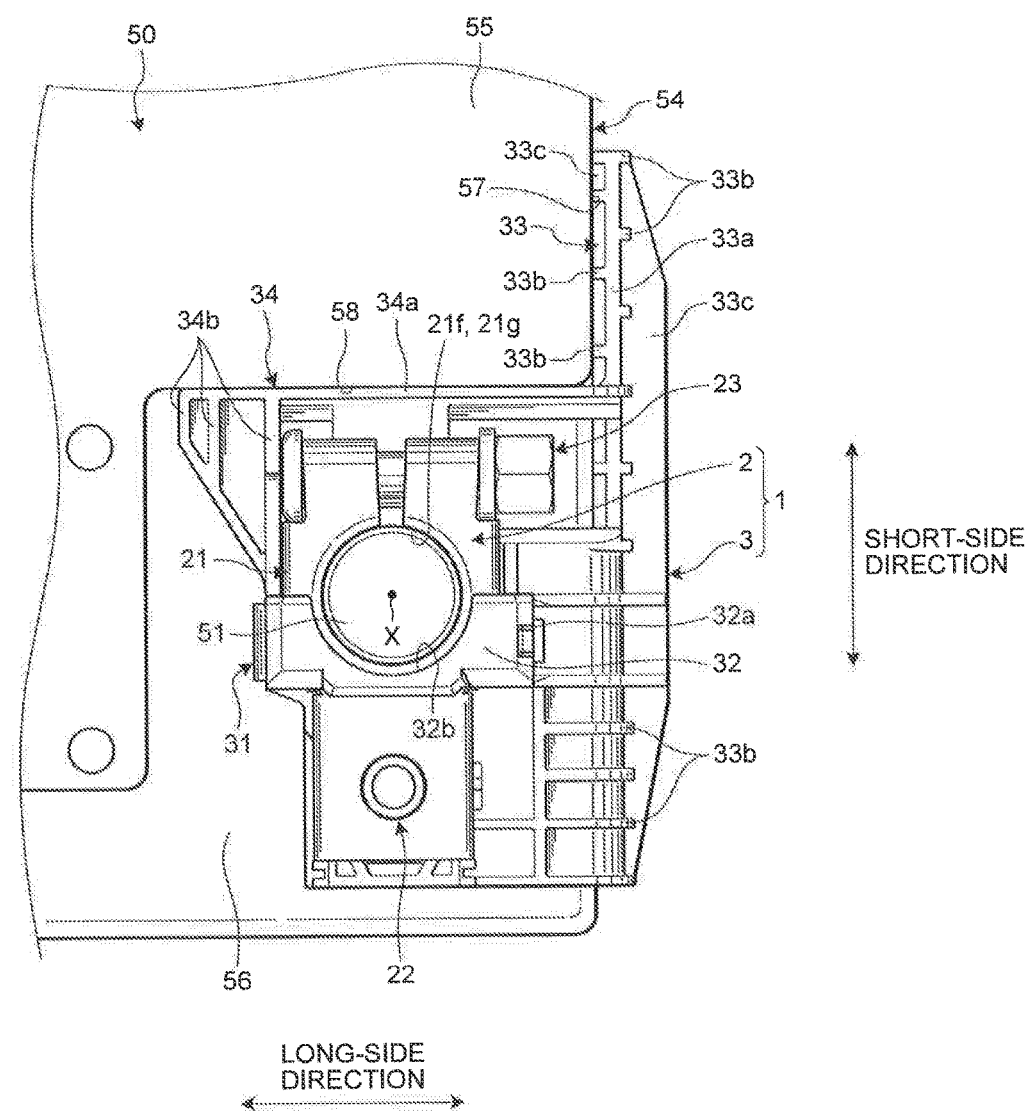
FIG. 2 is a partial plan view illustrating the schematic configuration of the battery terminal unit according to the first embodiment.

FIG. 1 is a partial perspective view illustrating the schematic configuration of a battery terminal unit according to a first embodiment. FIG. 2 is a partial plan view illustrating the schematic configuration of the battery terminal unit according to the first embodiment. In the following description, the direction along a center axis line X of a battery post is referred to as an axial direction. In order to make the following description be understood easily, one of two directions orthogonal to the axial direction is referred to as a long-side direction (first width direction) and the other of them is referred to as a short-side direction (second width direction) for the convenience. The axial direction, the long-side direction, and the short-side direction are orthogonal to one another.

A battery terminal unit 1 in the embodiment as illustrated in FIG. 1 and FIG. 2 is assembled on a battery post 51 of a battery 50 and includes a battery terminal 2 and a battery terminal stopper 3.

The battery 50 to which the battery terminal unit 1 is applied is mounted on a vehicle or the like as a power accumulation device, for example. The battery 50 includes a battery housing 52 and the battery post 51 provided in the battery housing 52. The battery housing 52 accommodates battery liquid and various components constituting the battery 50. The battery housing 52 includes a housing main body 53 having a substantially rectangular box shape and a lid member 54, and is formed into a substantially rectangular parallelepiped shape entirely. Any one of the surfaces of the housing main body 53 is opened. The lid member 54 closes the opened surface. Although the direction along the long-side direction of the battery housing 52 corresponds to the longer sides thereof and the direction along the short-side direction of the battery housing 52 corresponds to the shorter sides thereof, the configuration of the battery housing 52 is not limited thereto. The battery post 51 is formed by lead or the like and is provided upright on a post stand surface 55 of the lid member 54. The post stand surface 55 is a surface of the battery housing 52 on which the battery post 51 is provided upright. For example, the post stand surface 55 is an upper surface of the lid member 54 in the vertical direction in a state where the battery 50 is mounted on the vehicle or the like. The battery post 51 has a substantially columnar shape and is provided upright so as to project onto the post stand surface 55 with a positional relation that the center axis line X thereof is orthogonal to the post stand surface 55. To be more specific, the battery post 51 in the embodiment is provided upright in a recess 56 formed in the vicinity of a corner position of the post stand surface 55. The recess 56 is a portion depressed into a substantially rectangular shape in the vicinity of the corner position of the post stand surface 55. The battery post 51 is provided upright in the recess 56. The battery post 51 is tapered such that the diameter thereof is smaller toward the front end side in the axial direction typically. That is to say, the battery post 51 has a tapered shape that the outer diameter of the front end is smaller than the outer diameter of the base end.

The battery terminal unit 1 in the embodiment limits an assembled angle of the battery terminal 2 with respect to the battery post 51 by restricting rotation of the battery terminal 2 about the center axis line X of the battery post 51 as the rotating center by the battery terminal stopper 3 in a state where the battery terminal 2 is assembled on the battery post 51. With this configuration, the battery terminal unit 1 tries to improve assembling accuracy of the battery terminal 2. The following describes the respective configurations of the battery terminal unit 1 in detail.

Figure 3:
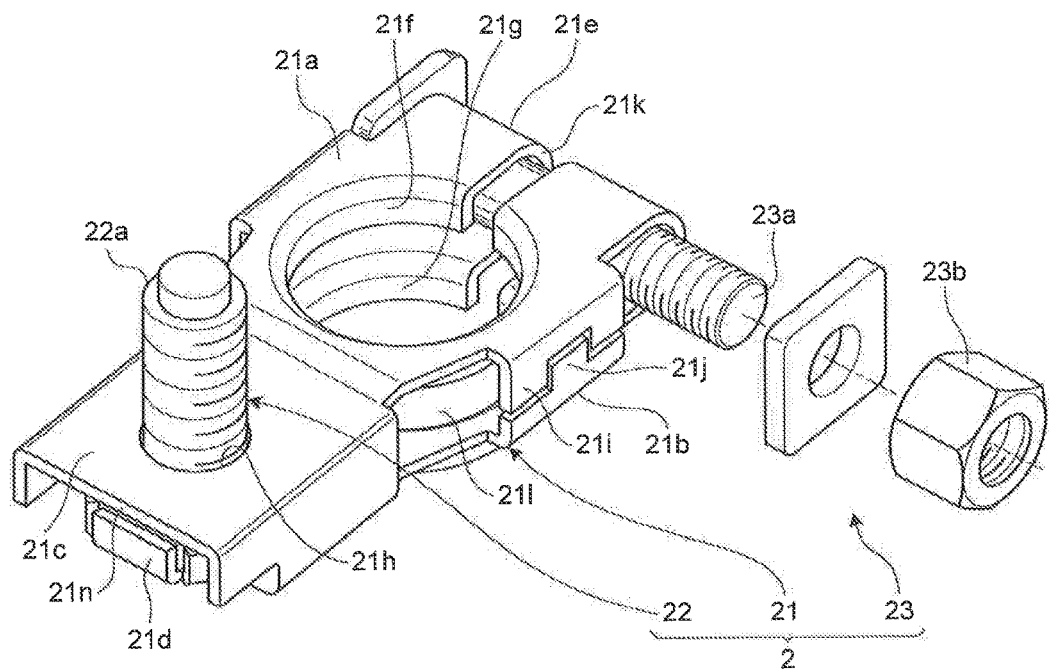
FIG. 3 is a perspective view illustrating the schematic configuration of a battery terminal according to the first embodiment.

FIG. 3 is a perspective view illustrating the schematic configuration of the battery terminal in the first embodiment. First, the configuration of the battery terminal 2 is described with reference to FIG. 1, FIG. 2, and FIG. 3.

The battery terminal 2 is a component that is attached to the battery post 51 so as to electrically connect the battery 50 and a clasp or the like provided on a terminal end of an electric wire on a main body of the vehicle or the like on which the battery 50 is mounted. The battery terminal. 2 includes a main body portion 21, a stud bolt 22, and a clumping portion 23.

The main body portion 21 is configured by integrally forming a pair of ring-like portions 21a and 21b, a pair of bolt holding portions 21c and 21d, and a bending coupling portion 21e by press folding processing of a metal plate having conductivity, for example. The pair of ring-like portions 21a and 21b are formed into substantially rectangular shapes and include post insertion holes 21f and 21g formed into substantially circular shapes into which the battery post 51 is inserted, respectively. The pair of bolt holding portions 21c and 21d are formed into substantially rectangular shapes and the bolt holding portion 21c includes a bolt insertion hole 21h having a substantially circular shape into which the stud bolt 22 is inserted. The bolt holding portion 21c is formed integrally with the ring-like portion 21a in a continuous manner and the bolt holding portion 21d is formed integrally with the ring-like portion 21b in a continuous manner. The ring-like portion 21a and the ring-like portion 21b are formed integrally such that end portions at the side opposite to end portions on which the bolt holding portions 21c and 21d are provided are continuous through the bending coupling portion 21e. With this configuration, the main body portion 21 is formed into a state of being folded back in a U-turn form with the bending coupling portion 21e interposed. The main body portion 21 is formed such that the ring-like portion 21a and the ring-like portion 21b, and the bolt holding portion 21c and the bolt holding portion 21d are laminated vertically in a state where the ring-like portion 21a and the bolt holding portion 21c, and the ring-like portion 21b and the bolt holding portion 21d are substantially parallel with each other.

The vertically laminated state typically corresponds to a state where they are laminated along the axial direction of the battery post 51 when the battery terminal 2 is assembled on the battery post 51. The lamination direction typically corresponds to the direction along the axial direction in the state where the battery terminal 2 is assembled on the battery post 51. The side at which a shaft portion 22a of the stud bolt 22, which will be describe later, projects corresponds to the upper side in the lamination direction, and the opposite side corresponds to the lower side in the lamination direction. Furthermore, the upper side in the lamination direction corresponds to the front end side of the battery post 51, and the lower side in the lamination direction corresponds to the base end side of the battery post 51. The main body portion 21 is arranged such that the ring-like portion 21a and the bolt holding portion 21c are at the upper side in the lamination direction and the ring-like portion 21b and the bolt holding portion 21d are at the lower side in the lamination direction.

The post insertion hole 21f and the post insertion hole 21g are formed on the pair of ring-like portions 21a and 21b, respectively, with a positional relation that the post insertion hole 21f and the post insertion hole 21g oppose to each other in the lamination direction in the state where the ring-like portions 21a and 21b are laminated vertically through the bending coupling portion 21e. The inner circumferential wall surfaces of the post insertion hole 21f and the post insertion hole 21g are formed by folding back a sheet metal in the same direction, in this example, to the lower side. The inner circumferential wall surfaces of the post insertion hole 21f and the post insertion hole 21g are tapered so as to correspond to the tapered portions of the battery post 51. The inner diameters of the post insertion hole 21f and the post insertion hole 21g at the side at which the shaft portion 22a of the stud bolt 22, which will be described later, projects, that is, at the post insertion hole 21f side are minimum and the inner diameters thereof at the opposite side, that is, at the post insertion hole 21g side are maximum. The respective inner circumferential surfaces of the post insertion hole 21f and the post insertion hole 21g make contact with the battery post 51 in a state where the battery post 51 is inserted thereinto. Furthermore, edge portions of the pair of ring-like portions 21a and 21b between the bending coupling portion 21e and the pair of bolt holding portions 21c and 21d are folded back toward each other. Folding-back portions 21i and 21j of the pair of ring-like portions 21a and 21b that are formed to have projections and recesses are engaged with each other.

The pair of bolt holding portions 21c and 21d are subject to folding processing in a state where the stud bolt 22 is inserted into the bolt insertion hole 21h previously before the folding processing. With this configuration, the bolt holding portions 21c and 21d hold the stud bolt 22 in a state of being laminated vertically through the bending coupling portion 21e. That is to say, the main body portion 21 holds the stud bolt 22 between the holding portion 21c and the bolt holding portion 21d in the lamination direction of the pair of bolt holding portions 21c and 21d.

The stud bolt 22 is exposed such that the shaft portion 22a projects from the bolt insertion hole 21h in a state of being held between the bolt holding portion 21c and the bolt holding portion 21d. The clasp or the like provided on the terminal end of the electric wire is electrically connected to the shaft portion 22a of the stud bolt 22 that is exposed from the bolt insertion hole 21h.

The main body portion 21 includes a slit (gap) 21k formed on the bending coupling portion 21e and the ring-like portions 21a and 21b so as to extend to the post insertion hole 21f and the post insertion hole 21g from the bending coupling portion 21e.

The clumping portion 23 is a member for clumping the pair of ring-like portions 21a and 21b to the battery post 51 in the state where the battery post 51 is inserted into the post insertion hole 21f and the post insertion hole 21g. The clumping portion 23 includes a bolt 23a and a nut 23b. The bolt 23a is inserted from one end portion of the bending coupling portion 21e with a positional relation of crossing the slit 21k. That is to say, the bolt 23a is inserted into an insertion hole portion formed between the pair of ring-like portions 21a and 21b in a state of being laminated vertically through the bending coupling portion 21e so as to cross the slit 21k. The nut 23b is screwed together with the front end portion of the bolt 23a that is exposed from the other end portion of the bending coupling portion 21e.

The battery terminal 2 configured as described above is assembled on the battery post 51 by inserting the battery post 51 into the post insertion hole 21f and the post insertion hole 21g with the positional relation that the shaft portion 22a of the stud bolt 22 is exposed. The bolt 23a and the nut 23b of the clumping portion 23 of the battery terminal 2 are clumped in a state where the inner circumferential surfaces of the post insertion hole 21f and the post insertion hole 21g make contact with the outer circumferential surface of the battery post 51. This causes both sides of the bending coupling portion 21e and the ring-like portions 21a and 21b to be clumped in the directions of making closer to each other with the slit 21k interposed therebetween. With this configuration, the diameters of the post insertion hole 21f and the post insertion hole 21g are made to be decreased in the state where the inner circumferential surfaces of the post insertion hole 21f and the post insertion hole 21g make contact with the outer circumferential surface of the battery post 51, so that the battery terminal 2 is clumped to the battery post 51 with a tightening force by the clumping portion 23. Furthermore, the clasp or the like provided on the terminal end of the electric wire is electrically connected to the shaft portion 22a of the stud bolt 22 of the battery terminal 2. On the other hand, when the bolt 23a and the nut 23b of the clumping portion 23 of the battery terminal 2 are loosened, both the sides of the bending coupling portion 21e and the ring-like portions 21a and 21b are loosened in the direction of being separated from each other with the slit 21k interposed therebetween. This enlarges the diameters of the post insertion hole 21f and the post insertion hole 21g, so that the battery terminal 2 can be detached from the battery post 51.

In the battery terminal unit. 1 according to the embodiment, the battery terminal stopper 3 is attached to the battery terminal 2 before the battery terminal 2 is assembled on the battery post 51. This can improve the assembling accuracy of the battery terminal 2.

Figure 4:
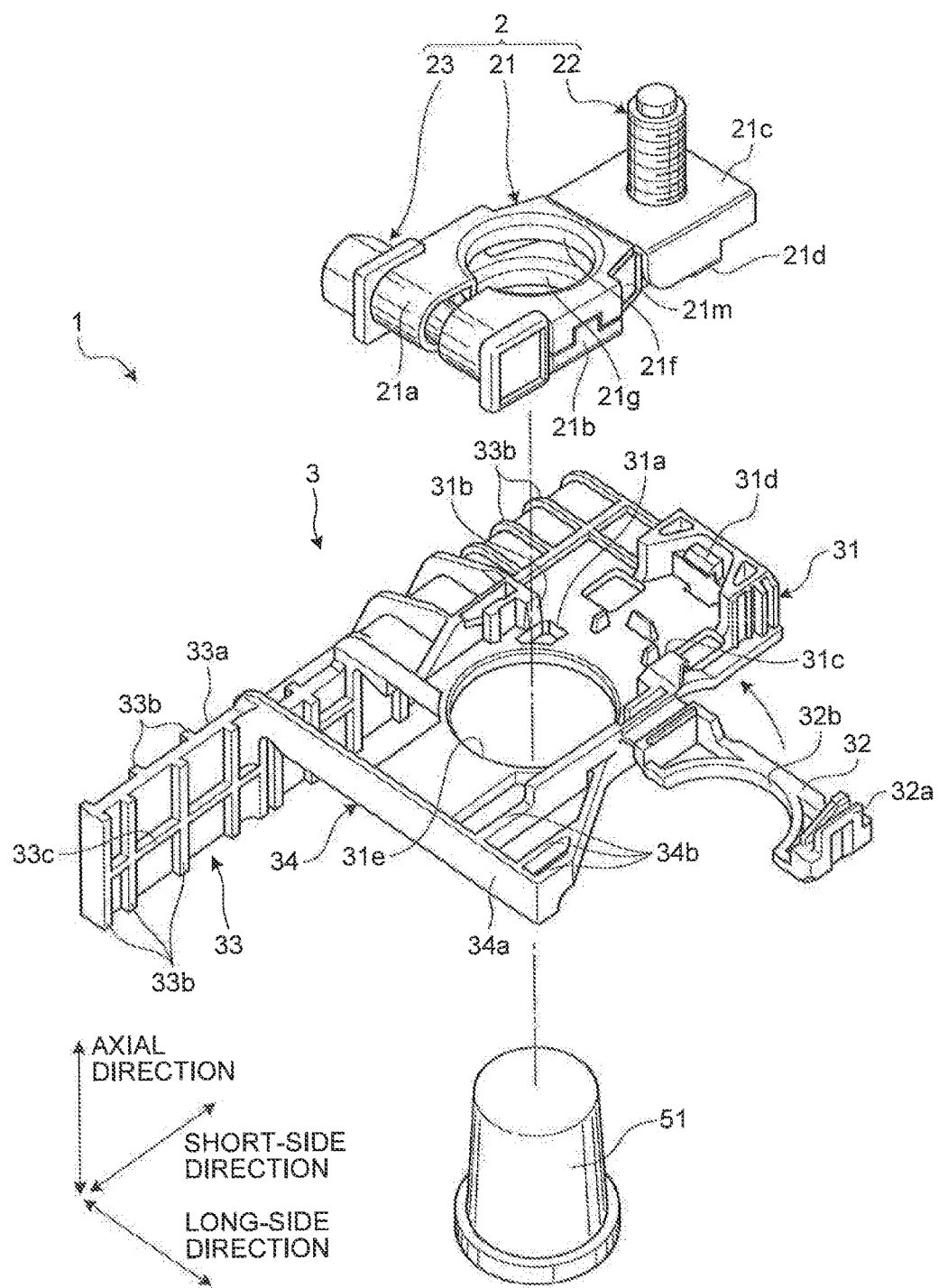
FIG. 4 is an exploded perspective view illustrating the schematic configuration of the battery terminal unit according to the first embodiment.
Figure 5:
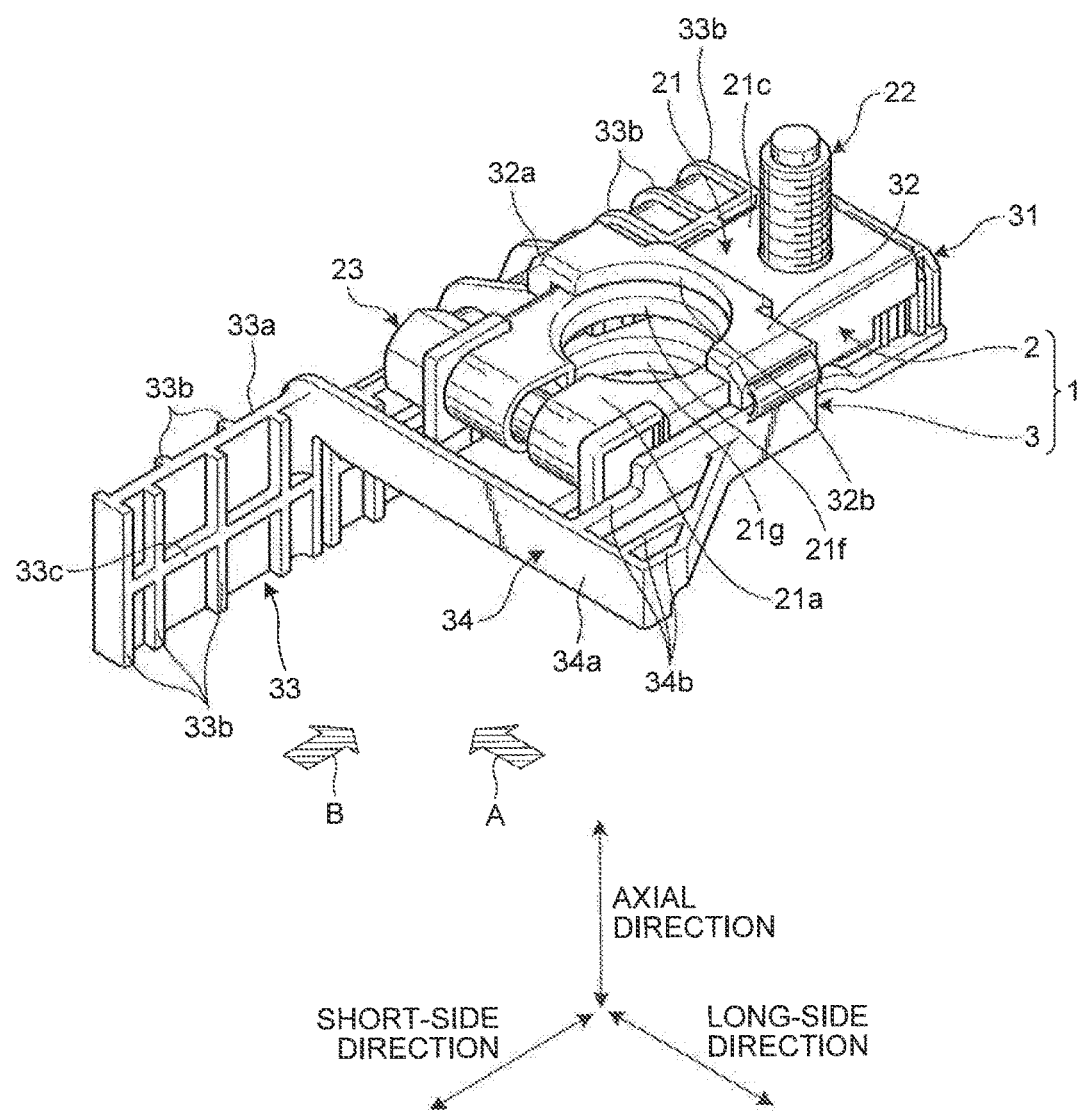
FIG. 5 is a perspective view illustrating the schematic configuration of the battery terminal unit according to the first embodiment.
Figure 6:
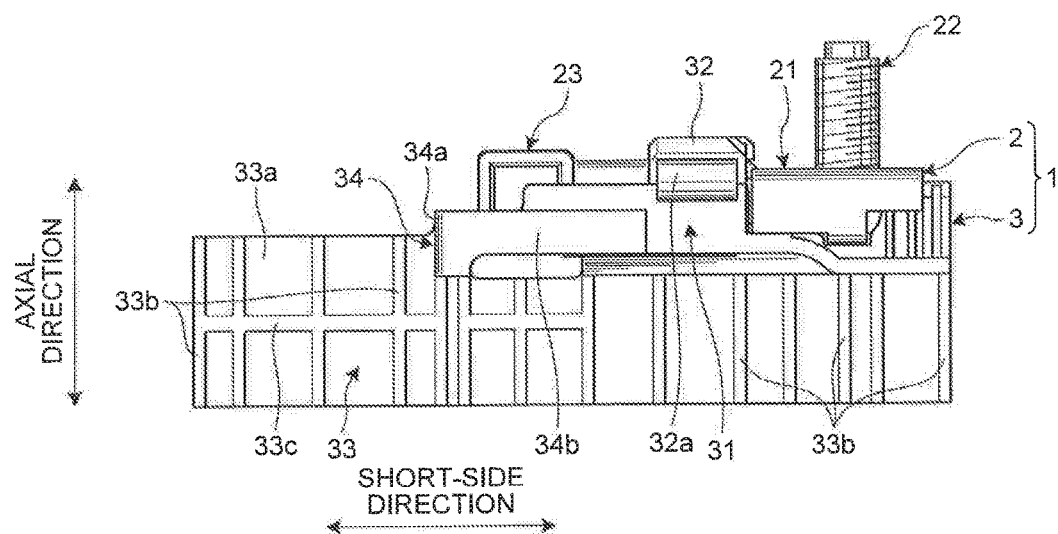
FIG. 6 is a view when seen from an arrow A in FIG. 5.
Figure 7:
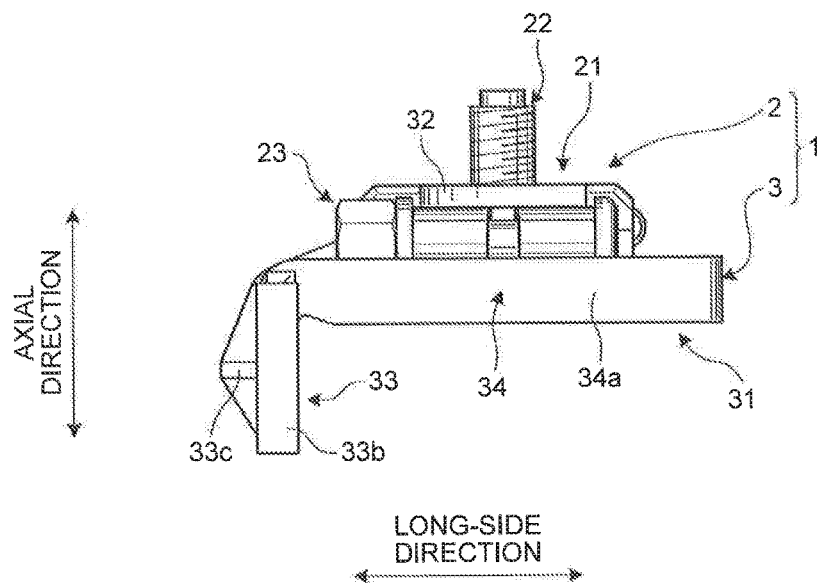
FIG. 7 is a view when seen from an arrow B in FIG. 5.

FIG. 4 is an exploded perspective view illustrating the schematic configuration of the battery terminal unit in the first embodiment. FIG. 5 is a perspective view illustrating the schematic configuration of the battery terminal unit in the first embodiment. FIG. 6 is a view when seen from an arrow A in FIG. 5. FIG. 7 is a view when seen from an arrow B in FIG. 5. The configuration of the battery terminal stopper 3 is described with reference to FIG. 1, FIG. 2, and FIG. 4 to FIG. 7.

As illustrated in FIG. 1 and FIG. 2, for example, the battery terminal stopper 3 is a member interposed between the lid member 54 of the battery housing 52 and the battery terminal 2. The battery terminal stopper 3 includes an attachment portion 31, a lid portion 32, a first rotation preventing portion 33, and a second rotation preventing portion 34. The battery terminal stopper 3 in the embodiment is configured by integrally forming the attachment portion 31, the lid portion 32, the first rotation preventing portion 33, and the second rotation preventing portion 34 with a synthetic resin material or the like in order to give corrosion resistance (anticorrosive function) to the battery liquid to the battery terminal stopper 3.

The attachment portion 31 is a portion capable of being attached to the battery terminal 2. As illustrated in FIG. 4 and FIG. 5, for example, the attachment portion 31 is attached to the side of the ring-like portion 21b and the bolt holding portion 21d of the battery terminal 2, that is, at the lower side thereof in the lamination direction so as to cover the lower sides of the ring-like portion 21b and the bolt holding portion 21d in the lamination direction. The attachment portion 31 includes an accommodation recess 31a accommodating the ring-like portion 21b and the bolt holding portion 21d by forming wall surfaces on a plate-like member. A plate-like portion constituting the bottom portion of the accommodation recess 31a of the attachment portion 31 is interposed between the ring-like portion 21b and the bolt holding portion 21d and the lid member 54 of the battery housing 52.

The attachment portion 31 includes three temporary locking claws 31b, 31c, and 31d and a post insertion hole 31e having a substantially circular shape that are formed in the accommodation recess 31a. The temporary locking claws 31b, 31c, and 31d are claws for temporarily locking the battery terminal 2. The battery post 51 is inserted into the post insertion hole 31e. The temporary locking claw 31b and the temporary locking claw 31c are formed at the sides of the post insertion hole 31e. The temporary locking claw 31b and the temporary locking claw 31c are formed at positions next to the post insertion hole 31e and at symmetrical positions with respect to the post insertion hole 31e in the direction (hereinafter, referred to as "long-side direction" simply in some cases) as the long-side direction of the battery terminal unit 1 in the state where the battery terminal unit 1 is assembled on the battery post 51. The temporary locking claw 31d is formed at a position separated from the post insertion hole 31e in the direction (hereinafter, referred to as "short-side direction" simply in some cases) as the short-side direction of the battery terminal unit 1 in the state where the battery terminal unit 1 is assembled on the battery post 51. When the attachment portion 31 is attached to the battery terminal 2, the temporary locking claw 31b is engaged with a space 21l (see FIG. 3) next to the folding-back portions 21i and 21j of the battery terminal 2, the temporary locking claw 31c is engaged with a space 21m (see FIG. 4) next to the folding-back portions 21i and 21j, and the temporary locking claw 31d is engaged with a space 21n (see FIG. 3) between the bolt holding portion 21c and the bolt holding portion 21d. This configuration enables the attachment portion 31 to temporarily lock the battery terminal 2 in the accommodation recess 31a. The post insertion hole 31e opposes the post insertion holes 21f and 21g along the axial direction (hereinafter, referred to as "axial direction" simply in some cases) when the battery terminal unit 1 is assembled on the battery post 51 in the state where the attachment portion 31 temporarily locks the battery terminal 2. In other words, the temporary locking claws 31b, 31c, and 31d and the post insertion hole 31e are formed on the attachment portion 31 so as to satisfy a positional relation that the post insertion hole 31e opposes the post insertion holes 21f and 21g along the axial direction in the state where the attachment portion 31 temporarily locks the battery terminal 2. Furthermore, in the state where the battery terminal 2 is temporarily locked by the attachment portion 31, the inner circumferential wall surface of the post insertion hole 21g is fitted into the post insertion hole 31e of the attachment portion 31. The lower side of the attachment portion 31 in the lamination direction, that is, the surface of the attachment portion 31 at the side opposing the lid member 54 in the state where the battery terminal unit 1 is assembled on the battery post 51 is reinforced by a reinforcing rib or the like.

As illustrated in FIG. 4 and FIG. 5, for example, the lid portion 32 is attached at the side of the ring-like portion 21a of the battery terminal 2, that is, at the upper side in the lamination direction so as to cover a part of the upper side of the ring-like portion 21a in the lamination direction. The lid portion 32 is coupled to the attachment portion 31 so as to be opened and closed. The lid portion 32 is made into the closed state in the state where the battery terminal 2 is temporarily locked by the attachment portion 31, so that the battery terminal 2 can be held between the lid portion 32 and the attachment portion 31. The lid portion 32 is restricted so as not to be opened when a lock portion 32a (also see FIG. 1 and FIG. 2, for example) is locked to the attachment portion 31 side in the state of holding the battery terminal 2 between the lid portion 32 and the attachment portion 31, that is, in the closed state. This enables the battery terminal 2 to be finally fixed. That is to say, the battery terminal stopper 3 sandwiches the battery terminal 2 between the attachment portion 31 and the lid portion 32 so as to keep the sandwiching state with the lock portion 32a. With this configuration, the battery terminal stopper 3 is assembled on the battery terminal 2. A semi-circular cut-out 32b into which the battery post 51 is inserted is formed on the lid portion 32 on a portion overlapping with the post insertion holes 21f, 21g, and 31e in the axial direction in the state where the battery terminal 2 is finally fixed. The cut-out 32b is formed so as to correspond to the shape of the battery post 51.

As illustrated in FIG. 1, FIG. 2, and FIG. 4 to FIG. 6, the first rotation preventing portion 33 is provided on the attachment portion 31. The first rotation preventing portion 33 is provided at a position opposing a first abutment surface 57 formed on the battery housing 52 in the state where the battery terminal 2 is assembled on the battery post 51 together with the attachment portion 31 (hereinafter, referred to as "assembled state" simply in some cases) (see FIG. 1 and FIG. 2, for example). The first abutment surface 57 is formed on the side surface of the battery housing 52, in this embodiment, the side surface along the short-side direction in the vicinity of the recess 56 formed on the post stand surface 55 of the lid member 54. The first rotation preventing portion 33 abuts against the first abutment surface 57 in the assembled state so as to be able to restrict rotation of the battery terminal 2 around the axial direction about the center axis line X of the battery post 51 as the rotating center.

To be more specific, the first rotation preventing portion 33 is provided to extend from the attachment portion 31, and includes a plate-like portion 33a opposing the first abutment surface 57 in the assembled state, and a plurality of longitudinal ribs 33b and a plurality of transverse ribs 33c for reinforcing the plate-like portion 33a. The plate-like portion 33a is formed into a plate form along the short-side direction. The plate-like portion 33a is provided to extend from the position in the vicinity of the corner of the lid member 54 to the position beyond the wall surface (wall surface on which a second abutment surface 58, which will be described later, is formed) defining the recess 56 along the short-side direction. The plate-like portion 33a includes the longitudinal ribs 33b and the transverse ribs 33c that are formed on an opposing surface opposing the first abutment surface 57 and the rear surface of the opposing surface. The longitudinal ribs 33b are projecting reinforcing portions extending along the axial direction and the transverse ribs 33c are projecting reinforcing portions extending along the short-side direction. Some of the longitudinal ribs 33b are provided to extend to the attachment portion 31 so as to reinforce a coupling portion between the plate-like portion 33a and the attachment portion 31. Furthermore, the front end surfaces of the longitudinal ribs 33b and the transverse ribs 33c formed on the opposing surface of the plate-like portion 33a that opposes the first abutment surface 57 at predetermined intervals correspond to contact surfaces abutting against the first abutment surface 57 actually. The front end surfaces (contact surfaces) of the longitudinal ribs 33b and the transverse ribs 33c formed on the opposing surface of the plate-like portion 33a are located on substantially the same plane.

As illustrated in FIG. 1, FIG. 2, FIG. 4, FIG. 5, and FIG. 7, the second rotation preventing portion 34 is provided on the attachment portion 31. The second rotation preventing portion 34 is formed at a position opposing the second abutment surface 58 formed on the battery housing 52 in the assembled state (see FIG. 1 and FIG. 2, for example). The second abutment surface 58 is formed on the battery housing 52 along the direction intersecting with the first abutment surface 57, in this example, the direction orthogonal to the first abutment surface 57. The second abutment surface 58 in the embodiment is formed on the wall surface of the recess 56 formed on the post stand surface 55 of the lid member 54 in the battery housing 52, the wall surface being orthogonal to the side surface of the battery housing 52 on which the first abutment surface 57 is formed. That is to say, the second abutment surface 58 is formed on the wall surface defining the recess 56 formed into the substantially rectangular shape, the wall surface being along the long-side direction. The second rotation preventing portion 34 abuts against the second abutment surface 58 in the assembled state so as to be able to restrict the rotation of the battery terminal 2 around the axial direction about the center axis line X of the battery post 51 as the rotating center.

To be more specific, the second rotation preventing portion 34 is provided to extend from the attachment portion 31, and includes a plate-like portion 34a opposing the second abutment surface 58 in the assembled state and a plurality of coupling ribs 34b coupling the plate-like portion 34a to the attachment portion 31. The plate-like portion 34a is formed into a plate form along the long-side direction. The plate-like portion 34a is provided to extend from the vicinity of the corner of the recess 56 to the plate-like portion 33a along the long-side direction in the assembled state and is substantially orthogonal to the plate-like portion 33a. The plate-like portion 34a includes the coupling ribs 34b formed on the rear surface of the opposing surface thereof opposing the second abutment surface 58. The coupling ribs 34b are provided to extend to the attachment portion 31 and reinforce a coupling portion between the plate-like portion 34a and the attachment portion 31. Furthermore, the opposing surface of the plate-like portion 34a that opposes the second abutment surface 58 corresponds to a contact surface abutting against the second abutment surface 58 actually. The plane including the opposing surface (contact surface) of the plate-like portion 34a is substantially orthogonal to the plane including the front end surfaces (contact surfaces) of the longitudinal ribs 33b and the transverse ribs 33c of the first rotation preventing portion 33. That is to say, the first rotation preventing portion 33 and the second rotation preventing portion 34 intersect with each other in a substantially T-shaped form when seen from the above as illustrated in FIG. 2.

The battery terminal stopper 3 configured as described above constitutes the battery terminal unit 1 together with the battery terminal 2 by attaching the attachment portion 31 to the battery terminal 2 (see FIG. 5, for example). The battery terminal unit 1 is assembled on the battery post 51 by inserting the battery post 51 into the post insertion hole 21f and the post insertion hole 21g of the battery terminal 2. In the assembled state of the battery terminal unit 1, the first rotation preventing portion 33 of the battery terminal stopper 3 abuts against the first abutment surface 57 of the battery housing 52 so as to restrict the rotation of the battery terminal 2 about the battery post 51 as the rotating center. Alternatively, the second rotation preventing portion 34 abuts against the second abutment surface 58 of the battery housing 52 so as to restrict the rotation of the battery terminal 2 about the battery post 51 as the rotating center. With this configuration, the battery terminal unit 1 can limit the allowable range of the assembled angle of the battery terminal 2 with respect to the battery post 51 to a relatively narrow range by the battery terminal stopper 3.

Figure 8:
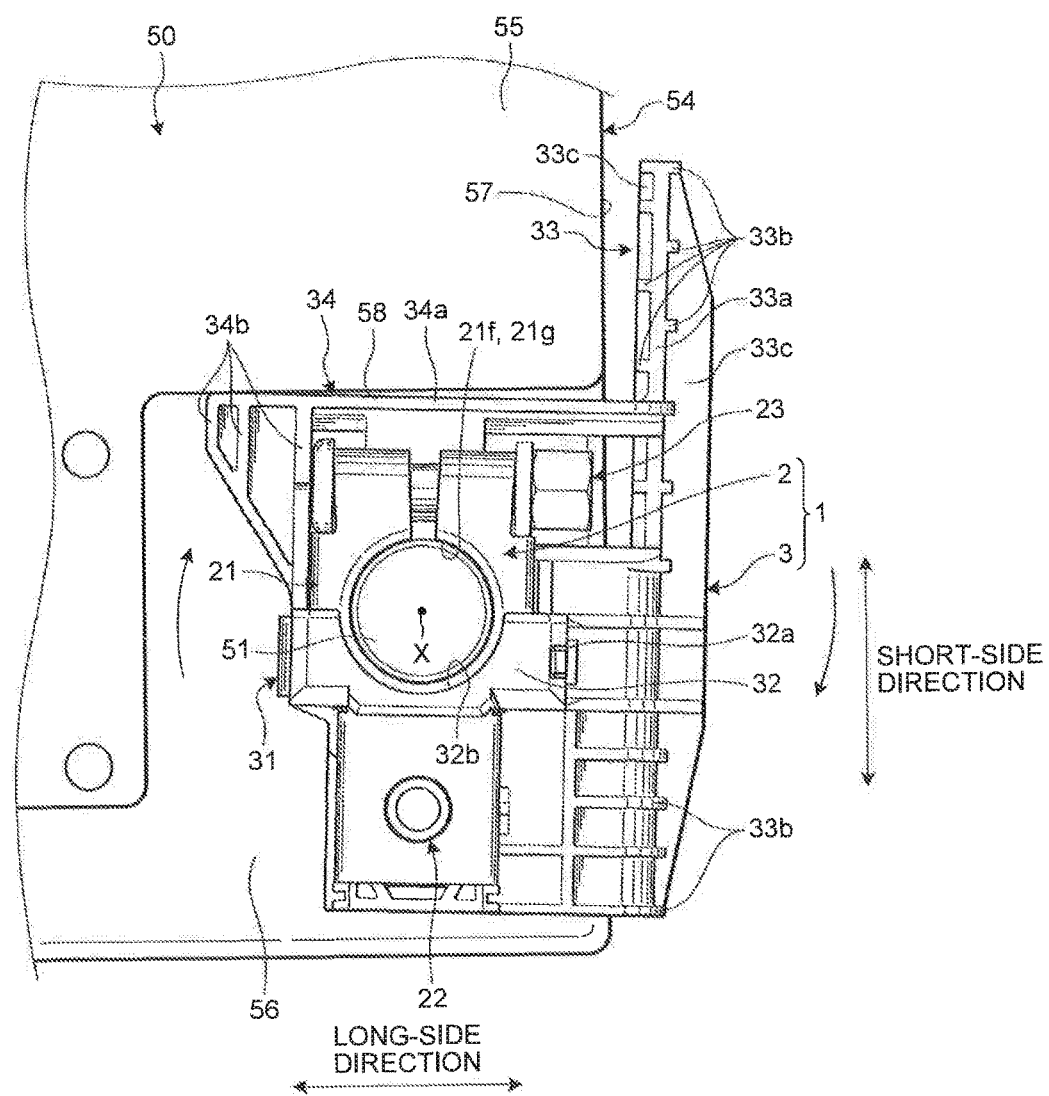
FIG. 8 is a partial plan view for explaining an allowable range of an assembled angle of the battery terminal unit according to the first embodiment.
Figure 9:
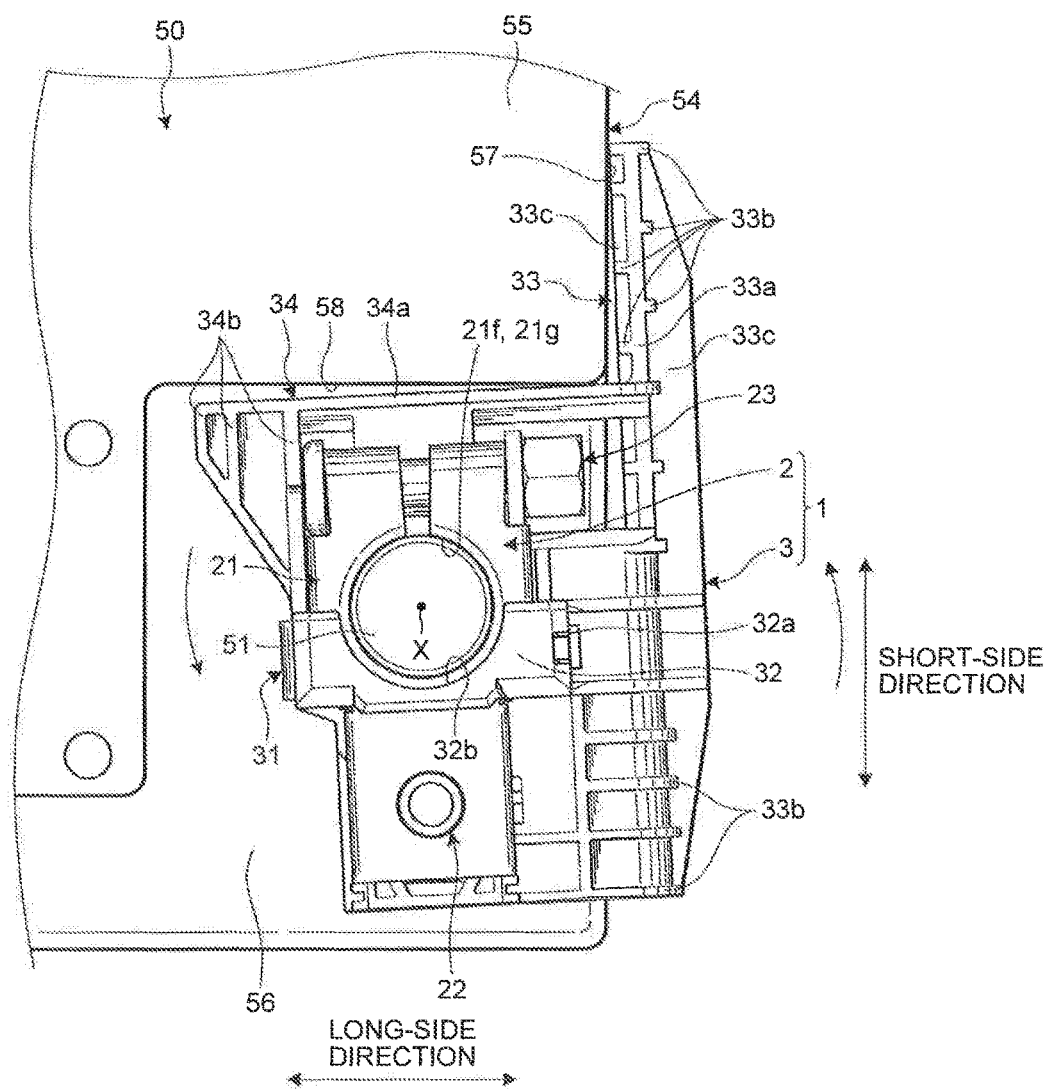
FIG. 9 is a partial plan view for explaining the allowable range of the assembled angle of the battery terminal unit according to the first embodiment.

FIG. 8 and FIG. 9 are partial plan views for explaining the allowable range of the assembled angle of the battery terminal unit in the first embodiment.

For example, as illustrated in FIG. 8, in the battery terminal unit 1, when the battery terminal 2 rotates integrally with the battery terminal stopper 3 in the clockwise direction about the battery post 51 as the rotating center, the second rotation preventing portion 34 abuts against the second abutment surface 58 before the first rotation preventing portion 33 abuts against the first abutment surface 57 so as to restrict the rotation of the battery terminal 2. This configuration enables the battery terminal stopper 3 to restrict the assembled angle of the battery terminal 2 by the second rotation preventing portion 34. In contrast, as illustrated in FIG. 9, in the battery terminal unit 1, when the battery terminal 2 rotates integrally with the battery terminal stopper 3 in the counter-clockwise direction about the battery post 51 as the rotating center, the first rotation preventing portion 33 abuts against the first abutment surface 57 before the second rotation preventing portion 34 abuts against the second abutment surface 58 so as to restrict the rotation of the battery terminal 2. This configuration enables the battery terminal stopper 3 to restrict the assembled angle of the battery terminal 2 by the first rotation preventing portion 33.

The first rotation preventing portion 33 of the battery terminal stopper 3 abuts against the first abutment surface 57 first in any cases of the rotation in the clockwise direction and the rotation in the counter-clockwise direction in some cases depending on a magnitude relation between a clearance between the first rotation preventing portion 33 and the first abutment surface 57 and a clearance between the second rotation preventing portion 34 and the second abutment surface 58. Note that the clearances can be generated in accordance with the dimensional tolerance (allowable dimensional error in manufacturing) of the attachment position dimension and the like of the battery post 51. In the same manner, the second rotation preventing portion 34 of the battery terminal stopper 3 abuts against the second abutment surface 58 first in any cases of the rotation in the clockwise direction and the rotation in the counter-clockwise direction in some cases depending on a magnitude relation between the clearance between the first rotation preventing portion 33 and the first abutment surface 57 and the clearance between the second rotation preventing portion 34 and the second abutment surface 58. In any of these cases, when the battery terminal 2 rotates with respect to the battery post 51, any one of the first rotation preventing portion 33 and the second rotation preventing portion 34 with a smaller clearance to the opposing abutment surface (first abutment surface 57 or second abutment surface 58) abuts first, so that the battery terminal stopper 3 restricts the rotation of the battery terminal 2 in the clockwise direction and restricts the rotation thereof in the counter-clockwise direction. With this configuration, the battery terminal stopper 3 can limit the allowable range of the assembled angle of the battery terminal 2 with respect to the battery post 51 to a relatively narrow range in comparison with the case where any one of the first rotation preventing portion 33 and the second rotation preventing portion 34 is not provided, for example.

The bolt 23a and the nut 23b of the clumping portion 23 are tightened in the state where the battery terminal stopper 3 limits the allowable range of the assembled angle with respect to the battery post 51 to the relatively narrow range as described above, so that the battery terminal 2 is clumped to the battery post 51. As a result, the battery terminal unit 1 can reduce fluctuation of the assembled angle of the battery terminal 2 within a relatively small angle range, thereby improving the assembling accuracy of the battery terminal 2 on the battery post 51. Accordingly, for example, the battery terminal unit 1 enables the battery terminal 2 to be assembled and clumped onto the battery post 51 at an appropriate assembled angle required in manufacturing. This can prevent components that are assembled on the battery terminal 2 from interfering with other components on the vehicle in the state where the battery 50 is mounted on the vehicle or the like.

The battery terminal unit 1 is configured by integrally forming the attachment portion 31, the first rotation preventing portion 33, and the second rotation preventing portion 34, and the attachment portion 31 is interposed between the battery terminal 2 and the lid member 54 of the battery housing 52 in the assembled state. In other words, in the battery terminal unit 1, the battery terminal stopper 3 is attached to the battery terminal 2 as described above, and then, the battery terminal 2 and the battery terminal stopper 3 are integrally assembled on the battery post 51. With this configuration, the attachment portion 31 is interposed between the battery terminal 2 and the lid member 54. In this case, for example, in the battery terminal unit 1, when a worker inserts the battery post 51 into the post insertion hole 21f and the post insertion hole 21g of the battery terminal 2, the first rotation preventing portion 33 and the second rotation preventing portion 34 function as a positioning mechanism of the battery terminal unit 1 in the horizontal direction. This enables the battery post 51 to be inserted into the post insertion hole 21f and the post insertion hole 21g easily. That is to say, in the battery terminal unit 1, the first rotation preventing portion 33 abuts against the first abutment surface 57 and the second rotation preventing portion 34 abuts against the second abutment surface 58 so as to guide an operation of inserting the battery post 51 into the post insertion hole 21f and the post insertion hole 21g while positioning the battery terminal unit 1 in the short-side direction and the long-side direction. As a result, in the battery terminal unit 1, the first rotation preventing portion 33 and the second rotation preventing portion 34 function as guide members for inserting the battery post 51 into the post insertion hole 21f and the post insertion hole 21g, thereby improving operability when the battery terminal 2 is assembled on the battery post 51.

The battery terminal unit 1 as described above includes the battery terminal 2 and the battery terminal stopper 3. The battery terminal 2 is assembled on the battery post 51 provided on the battery housing 52. The battery terminal stopper 3 includes the attachment portion 31, the first rotation preventing portion 33, and the second rotation preventing portion 34. The attachment portion 31 can be attached to the battery terminal 2. The first rotation preventing portion 33 is provided on the attachment portion 31, opposes the first abutment surface 57 formed on the side surface of the battery housing 52 and abuts against the first abutment surface 57 in the state where the battery terminal 2 is assembled on the battery post 51 together with the attachment portion 31 so as to be able to restrict the rotation of the battery terminal 2 about the battery post 51 as the rotating center. The second rotation preventing portion 34 is provided on the attachment portion 31, opposes the second abutment surface 58 formed on the battery housing 52 along the direction intersecting with the first abutment surface 57 and abuts against the second abutment surface 58 in the state where the battery terminal 2 is assembled on the battery post 51 together with the attachment portion 31 so as to be able to restrict the rotation of the battery terminal 2 about the battery post 51 as the rotating center. Accordingly, the battery terminal unit 1 and the battery terminal stopper 3 can limit the allowable range of the assembled angle of the battery terminal 2 with respect to the battery post 51 to the relatively narrow range, thereby improving the assembling accuracy of the battery terminal 2 on the battery post 51.

Furthermore, with the battery terminal unit 1 described above, the second abutment surface 58 is formed on the wall surface of the recess 56 that is formed on the post stand surface 55 provided with the battery post 51 in the battery housing 52 and on which the battery post 51 is provided upright, the wall surface being orthogonal, to the side surface of the battery housing 52 on which the first abutment surface 57 is formed. That is, the second abutment surface 58 as the abutment surface of the second rotation preventing portion 34 is formed on the wall surface of the recess 56 formed on the post stand surface 55. With this configuration, the battery terminal unit 1 and the battery terminal stopper 3 can make a projecting portion of the battery terminal stopper 3 from the contour of the battery housing 52 relatively small in the assembled state to save space, and can improve the assembling accuracy of the battery terminal 2.

Furthermore, with the battery terminal unit 1 described above, the first rotation preventing portion 33 and the second rotation preventing portion 34 are formed integrally with the attachment portion 31. The attachment portion 31 is interposed between the battery terminal 2 and the battery housing 52 in the state where the battery terminal 2 is assembled on the battery post 51 together with the attachment portion 31. Accordingly, in the battery terminal unit 1 and the battery terminal stopper 3, the first rotation preventing portion 33 and the second rotation preventing portion 34 function as the guide members for inserting the battery post 51 into the post insertion hole 21*f* and the post insertion hole 21*g*, thereby improving operability when the battery terminal 2 is assembled on the battery post 51.

Second Embodiment

Figure 10:
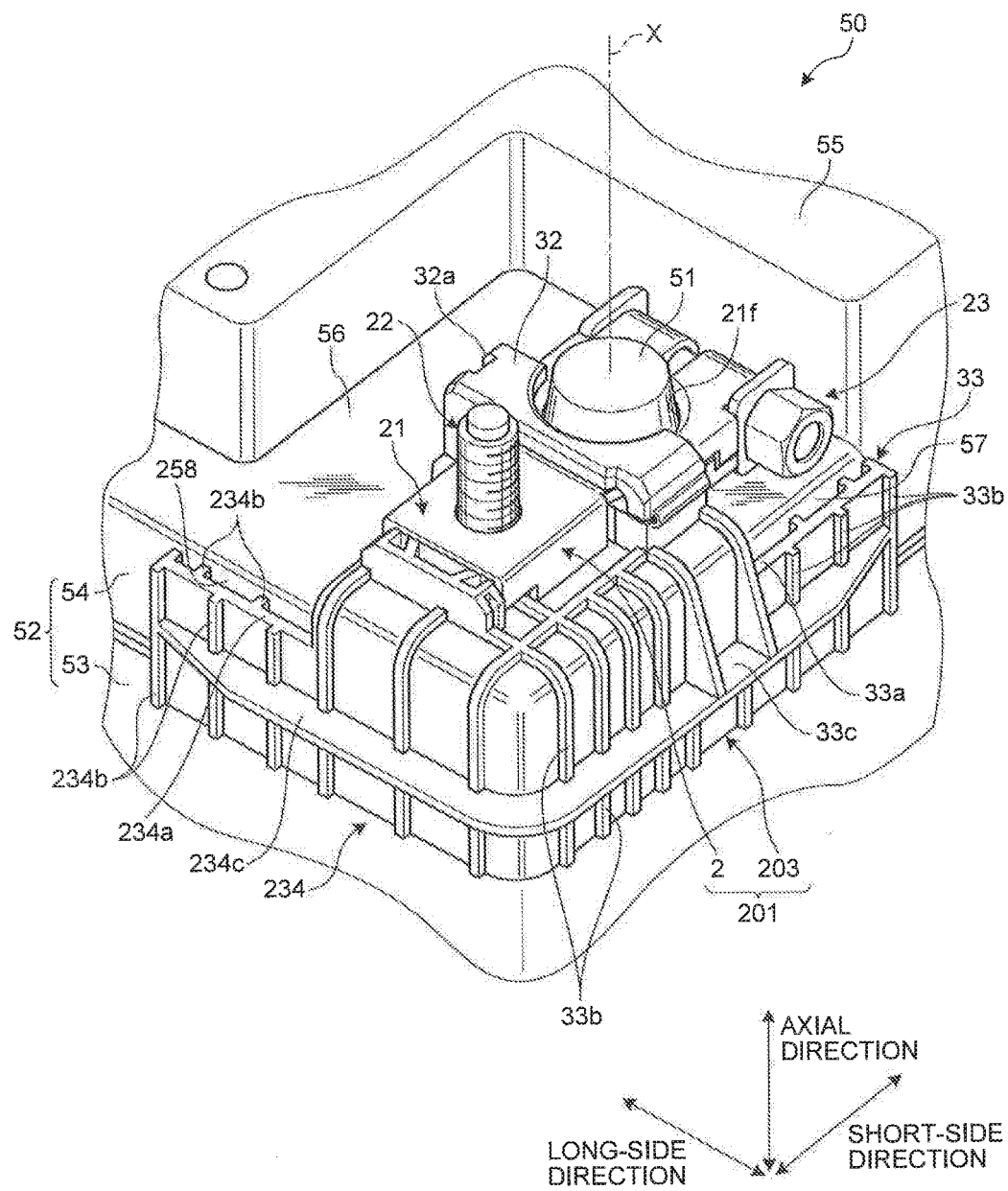
FIG. 10 is a partial perspective view illustrating the schematic configuration of a battery terminal unit according to a second embodiment of the present invention.
Figure 11:
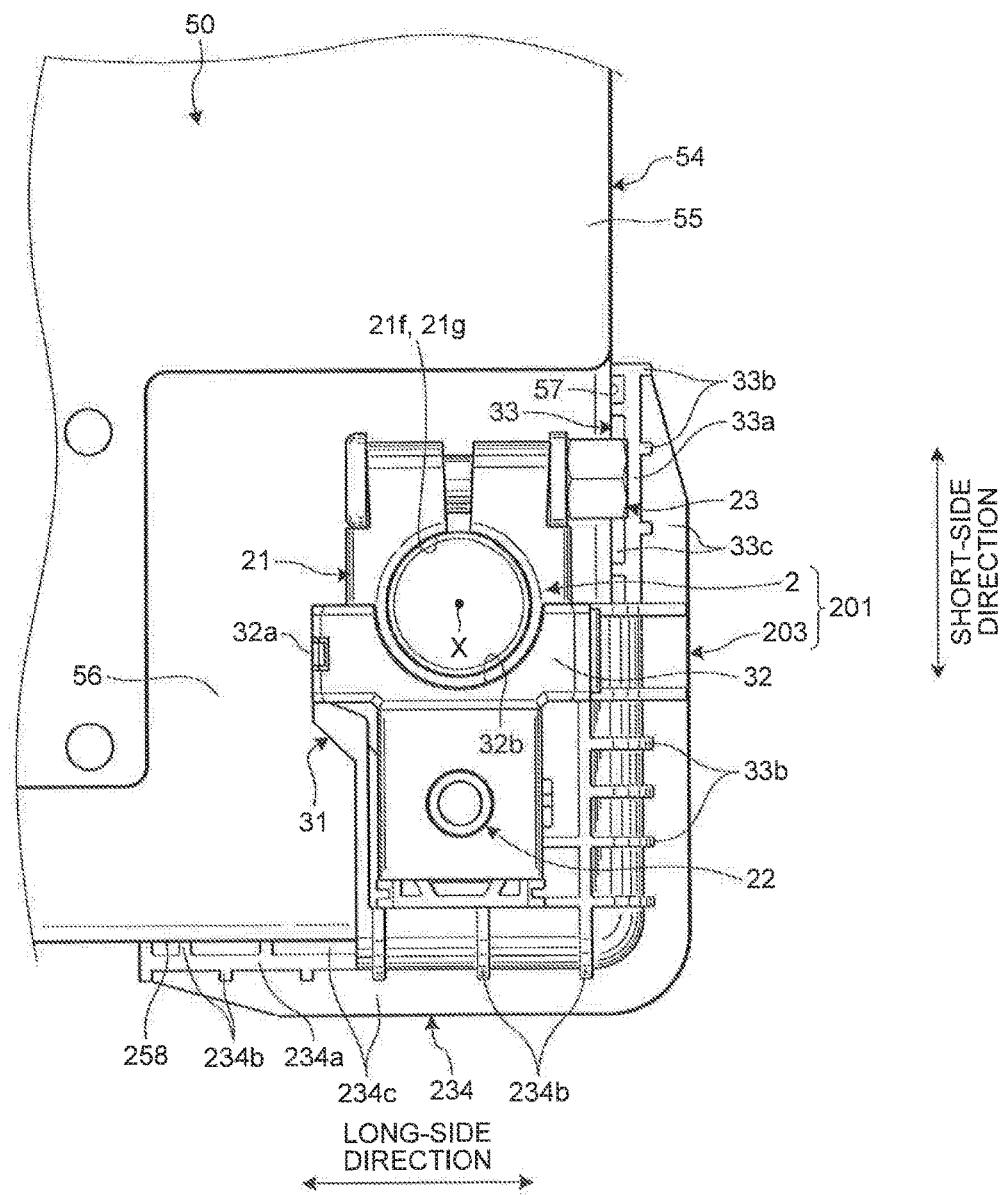
FIG. 11 is a partial plan view illustrating the schematic configuration of the battery terminal unit according to the second embodiment.
Figure 12:
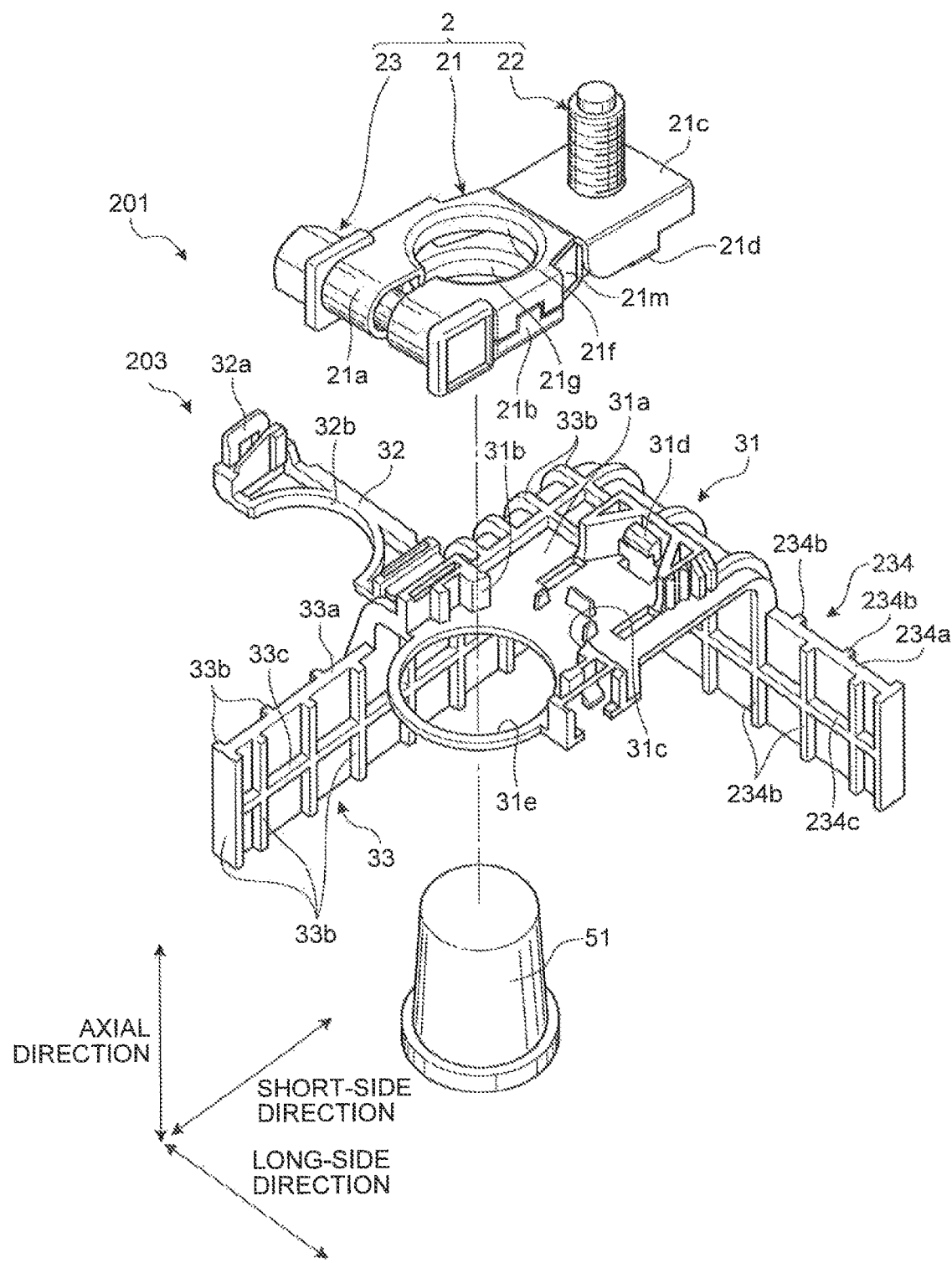
FIG. 12 is an exploded perspective view illustrating the schematic configuration of the battery terminal unit according to the second embodiment.
Figure 13:
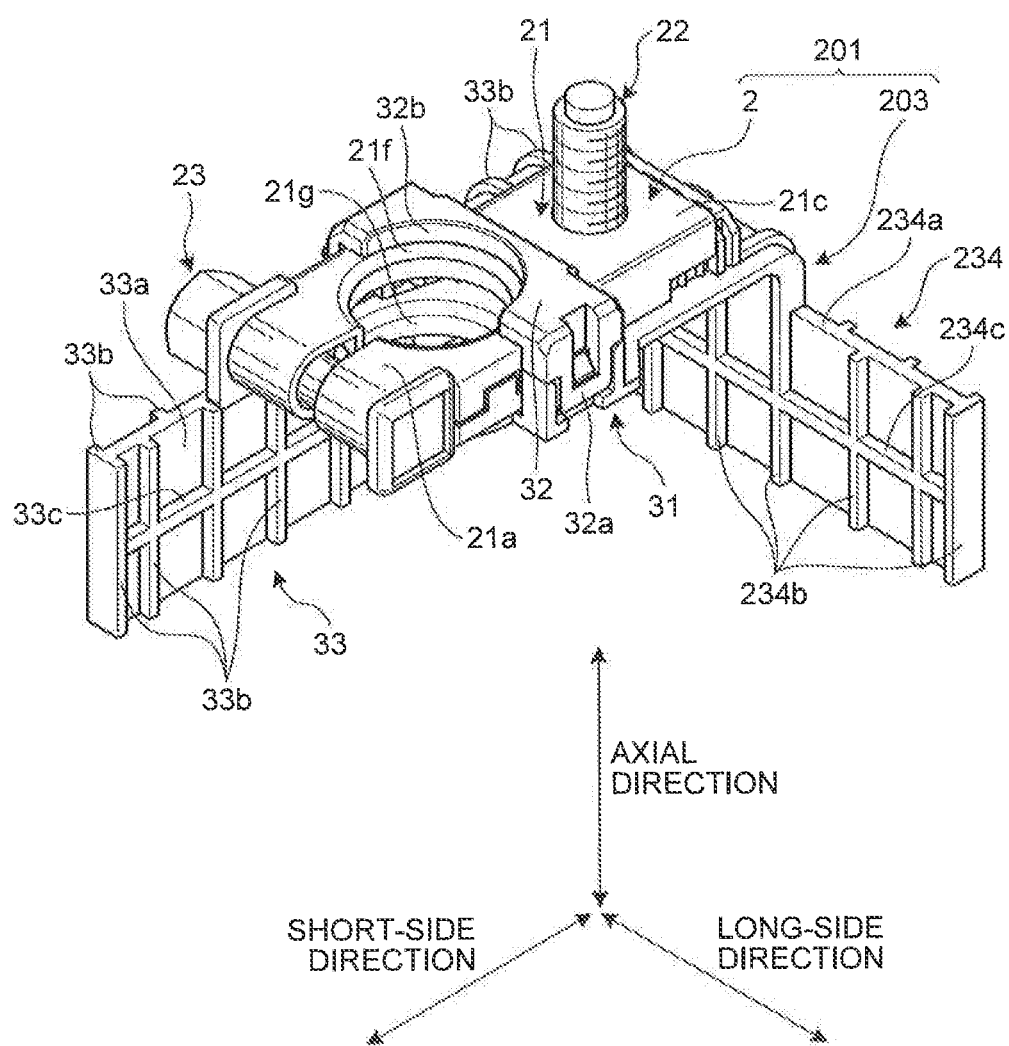
FIG. 13 is a perspective view illustrating the schematic configuration of the battery terminal unit according to the second embodiment.

FIG. 10 is a partial perspective view illustrating the schematic configuration of a battery terminal unit according to a second embodiment. FIG. 11 is a partial plan view illustrating the schematic configuration of the battery terminal unit in the second embodiment. FIG. 12 is an exploded perspective view illustrating the schematic configuration of the battery terminal unit in the second embodiment. FIG. 13 is a perspective view illustrating the schematic configuration of the battery terminal unit in the second embodiment. Positions of a second abutment surface and a second rotation preventing portion in a battery terminal stopper and the battery terminal unit in the second embodiment are different from those in the first embodiment. In addition, overlapped description of configurations, actions, effects common to those in the above-mentioned embodiment are omitted as much as possible (the same holds true for the following embodiment and modifications).

A battery terminal unit 201 in the embodiment as illustrated in FIG. 10, FIG. 11, FIG. 12, and FIG. 13 includes the battery terminal 2 and a battery terminal stopper 203. The battery terminal stopper 203 in the embodiment includes the attachment portion 31, the lid portion 32, the first rotation preventing portion 33, and a second rotation preventing portion 234. In this embodiment, the positions of the lid portion 32 and the lock portion 32*a* are different from those in the first embodiment.

The second rotation preventing portion 234 is provided on the attachment portion 31. The second rotation preventing portion 234 is formed at a position opposing a second abutment surface 258 formed on the battery housing 52 in the assembled state (see FIG. 10 and FIG. 11, for example). The second abutment surface 258 is formed on the battery housing 52 along the direction intersecting with the first abutment surface 57, in this example, along the direction orthogonal to the first abutment surface 57. The second abutment surface 258 in the embodiment is formed on the side surface of the battery housing 52 that is orthogonal to the side surface of the battery housing 52 on which the first abutment surface 57 is formed, in this embodiment, the side surface being along the long-side direction in the vicinity of the recess 56 formed on the post stand surface 55 of the lid member 54. The second rotation preventing portion 234 abuts against the second abutment surface 258 in the assembled state so as to be able to restrict rotation of the battery terminal 2 around the axial direction about the center axis line X of the battery post 51 as the rotating center.

To be more specific, the second rotation preventing portion 234 is provided to extend from the attachment portion 31, and includes a plate-like portion 234*a* opposing the second abutment surface 258 in the assembled state, and a plurality of longitudinal ribs 234*b* and a plurality of transverse ribs 234*c* for reinforcing the plate-like portion 234*a*. The plate-like portion 234*a* is formed into a plate form along the long-side direction. The plate-like portion 234*a* is provided to extend from the position in the vicinity of the corner of the lid member 54 to the vicinity of the wall surface defining the recess 56 in the assembled state along the long-side direction. The plate-like portion 234*a* includes the longitudinal ribs 234*b* and the transverse ribs 234*c* that are formed on an opposing surface opposing the second abutment surface 258 and the rear surface of the opposing surface. The longitudinal ribs 234*b* are projecting reinforcing portions extending along the axial direction and the transverse ribs 234*c* are projecting reinforcing portions extending along the long-side direction. Some of the longitudinal ribs 234*b* are provided to extend to the attachment portion 31 so as to reinforce a coupling portion between the plate-like portion 234*a* and the attachment portion 31. Furthermore, the front end surfaces of the longitudinal ribs 234*b* and the transverse ribs 234*c* formed on the opposing surface of the plate-like portion 234*a* that opposes the second abutment surface 258 at predetermined intervals correspond to contact surfaces abutting against the second abutment surface 258 actually. The front end surfaces (contact surfaces) of the longitudinal ribs 234*b* and the transverse ribs 234*c* formed on the opposing surface of the plate-like portion 234*a* are located on substantially the same plane. The plane including the front end surfaces (contact surfaces) of the longitudinal ribs 234*b* and the transverse ribs 234*c* of the second rotation preventing portion 234 is substantially orthogonal to the plane including the front end surfaces (contact surfaces) of the longitudinal ribs 33*b* and the transverse ribs 33*c* of the first rotation preventing portion 33. That is to say, the first rotation preventing portion 33 and the second rotation preventing portion 234 intersect with each other in a substantially L-shaped form when seen from the above as illustrated in FIG. 11.

The battery terminal stopper 203 configured as described above constitutes the battery terminal unit 201 together with the battery terminal 2 by attaching the attachment portion 31 to the battery terminal 2 (see FIG. 13, for example). In the assembled state of the battery terminal unit 201, the first rotation preventing portion 33 of the battery terminal stopper 203 abuts against the first abutment surface 57 of the battery housing 52 so as to restrict the rotation of the battery terminal 2 about the battery post 51 as the rotating center. Alternatively, the second rotation preventing portion 234 abuts against the second abutment surface 258 of the battery housing 52 so as to restrict the rotation of the battery terminal 2 about the battery post 51 as the rotating center. With this configuration, the battery terminal unit 201 can limit the allowable range of the assembled angle of the battery terminal 2 with respect to the battery post 51 to a relatively narrow range by the battery terminal stopper 203.

The battery terminal unit 201 and the battery terminal stopper 203 described above can limit the allowable range of the assembled angle of the battery terminal 2 with respect to the battery post 51 to the relatively narrow range, thereby improving the assembling accuracy of the battery terminal 2 on the battery post 51.

Furthermore, with the battery terminal unit 201 described above, the second abutment surface 258 is formed on the side surface of the battery housing 52 that is orthogonal to the side surface of the battery housing 52 on which the first abutment surface 57 is formed. That is, the second abutment surface 258 as the abutment surface of the second rotation preventing portion 234 is formed on the side surface that is orthogonal to the first abutment surface 57. With this configuration, the battery terminal unit 201 and the battery terminal stopper 203 enables the second rotation preventing portion 234 having an appropriate size to be provided, thereby improving the assembling accuracy of the battery terminal more reliably.

The battery terminal stopper and the battery terminal unit in the above-mentioned embodiments of the invention are not limited to those in the above-mentioned embodiments, and various changes can be made in a range described in the scope of the appended claims. The battery terminal stopper and the battery terminal unit in the embodiment may be configured by appropriately combining constituent components in the respective embodiments as described above.

Although the battery terminal 2 is configured by press folding processing of the metal plate having conductivity, the invention is not limited thereto. Moreover, the positional relation among the battery terminal 2, the first rotation preventing portion 33, and the second rotation preventing portion 34 or 234 in the state where the battery terminal stopper 3 or 203 is attached to the battery terminal 2 may be adjusted appropriately in accordance with the assembled angle required in manufacturing.

The battery terminal stopper 3 or 203 of the battery terminal unit 1 or 201 described above includes the attachment portion 31, the first rotation preventing portion 33, and the second rotation preventing portion 34 or 234. The attachment portion 31 is capable of being attached to the battery terminal 2. The first rotation preventing portion 33 is provided on the attachment portion 31, opposes the first abutment surface 57 formed on the battery housing 52 and abuts against the first abutment surface 57 in the state where the battery terminal 2 is assembled on the battery post 51 together with the attachment portion 31 so as to be able to restrict the rotation of the battery terminal 2 about the battery post 51 as the rotating center. The second rotation preventing portion 34 or 234 is provided on the attachment portion 31, opposes the second abutment surface 58 or 258 formed on the surface of the battery housing 52 that is different from the first abutment surface 57 and abuts against the second abutment surface 58 or 258 in the state where the battery terminal 2 is assembled on the battery post 51 together with the attachment portion 31 so as to be able to restrict the rotation of the battery terminal 2 about the battery post 51 as the rotating center. In the battery terminal stopper 3, the surface of the battery housing 52 that is different from the first abutment surface 57 and on which the second abutment surface 58 is formed corresponds to the wall surface of the recess 56 formed on the post stand surface 55 and the wall surface that is orthogonal to the side surface of the battery housing 52 on which the first abutment surface 57 is formed. On the other hand, in the battery terminal stopper 203, the surface of the battery housing 52 that is different from the first abutment surface 57 and on which the second abutment surface 258 is formed corresponds to the side surface of the battery housing 52 that is orthogonal to the side surface of the battery housing 52 on which the first abutment surface 57 is formed, that is, corresponds to the side surface along the long-side direction in the vicinity of the recess 56 formed on the post stand surface 55 of the lid member 54. The positions of the respective rotation preventing portions and the positional relations of the respective abutment surfaces are not limited to those described above. The following describes modifications with reference to FIG. 14 to FIG. 17.

Modifications

FIG. 14, FIG. 15, FIG. 16, and FIG. 17 are partial plan views illustrating the schematic configuration of a battery terminal unit according to a modification. Positions of respective rotation preventing portions of battery terminal units 301, 401, 501, and 601 according to the modifications as illustrated in FIG. 14 to FIG. 17 are different from those in the first embodiment and the second embodiment described above.

Figure 14:
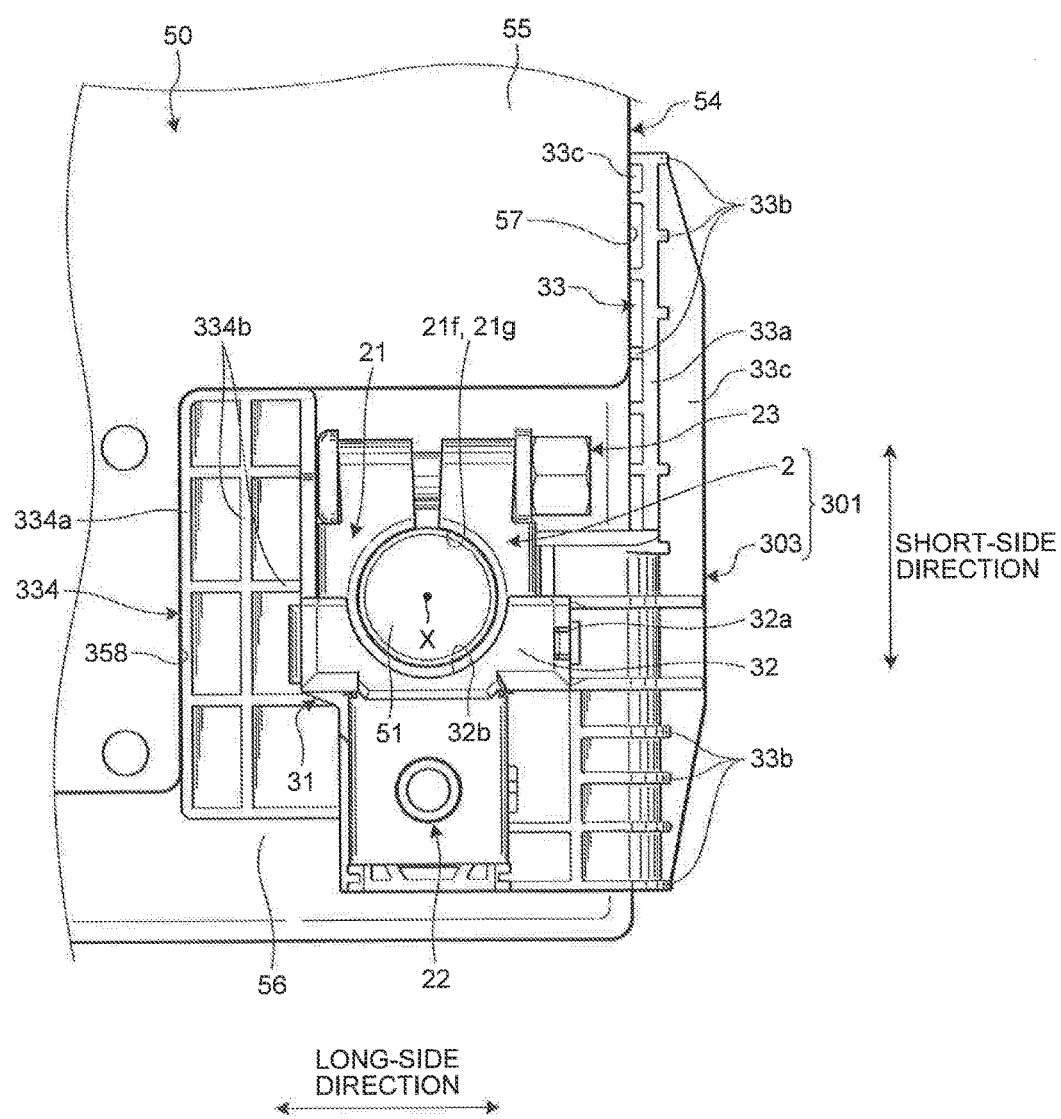
FIG. 14 is a partial plan view illustrating the schematic configuration of a battery terminal unit according to a modification.

The battery terminal unit 301 according to the modification illustrated in FIG. 14 includes the battery terminal 2 and a battery terminal stopper 303. The battery terminal stopper 303 in the modification includes the attachment portion 31, the lid portion 32, the first rotation preventing portion 33, and a second rotation preventing portion 334.

The second rotation preventing portion 334 is provided on the attachment portion 31. The second rotation preventing portion 334 is formed at a position opposing a second abutment surface 358 formed on the battery housing 52 in the assembled state. The second abutment surface 358 is formed on the surface of the battery housing 52 that is different from the first abutment surface 57. The second abutment surface 358 in the modification is formed on the wall surface of the recess 56 formed on the post stand surface 55 of the lid member 54 in the battery housing 52, the wall surface opposing the side surface of the battery housing 52 on which the first abutment surface 57 is formed substantially in parallel. That is to say, the second abutment surface 358 is formed on the wall surface defining the recess 56 formed into a substantially rectangular shape, the wall surface being along the short-side direction. The second rotation preventing portion 334 abuts against the second abutment surface 358 in the assembled state so as to restrict the rotation of the battery terminal 2 around the axial direction about the battery post 51 as the rotating center.

To be more specific, the second rotation preventing portion 334 is provided to extend from the attachment portion 31, and includes a plate-like portion 334a opposing the second abutment surface 358 in the assembled state and a plurality of coupling ribs 334b coupling the plate-like portion 334a to the attachment portion 31. The plate-like portion 334a is formed into a plate form along the short-side direction. The plate-like portion 334a is provided to extend along the wall surface defining the recess 56, the wall surface being along the short-side direction in the assembled state, and is substantially parallel with the plate-like portion 33a. The plate-like portion 334a includes the coupling ribs 334b formed on the rear surface of the opposing surface thereof opposing the second abutment surface 358. The coupling ribs 334b are provided to extend to the attachment portion 31 and reinforce a coupling portion between the plate-like portion 334a and the attachment portion 31. Furthermore, the opposing surface of the plate-like portion 334a that opposes the second abutment surface 358 corresponds to a contact surface abutting against the second abutment surface 358 actually. The plane including the opposing surface (contact surface) of the plate-like portion 334a is substantially parallel with the plane including the front end surfaces (contact surfaces) of the longitudinal ribs 33b and the transverse ribs 33c of the first rotation preventing portion 33. That is to say, the first rotation preventing portion 33 and the second rotation preventing portion 334 are substantially parallel with each other when seen from the above as illustrated in FIG. 14.

Figure 15:
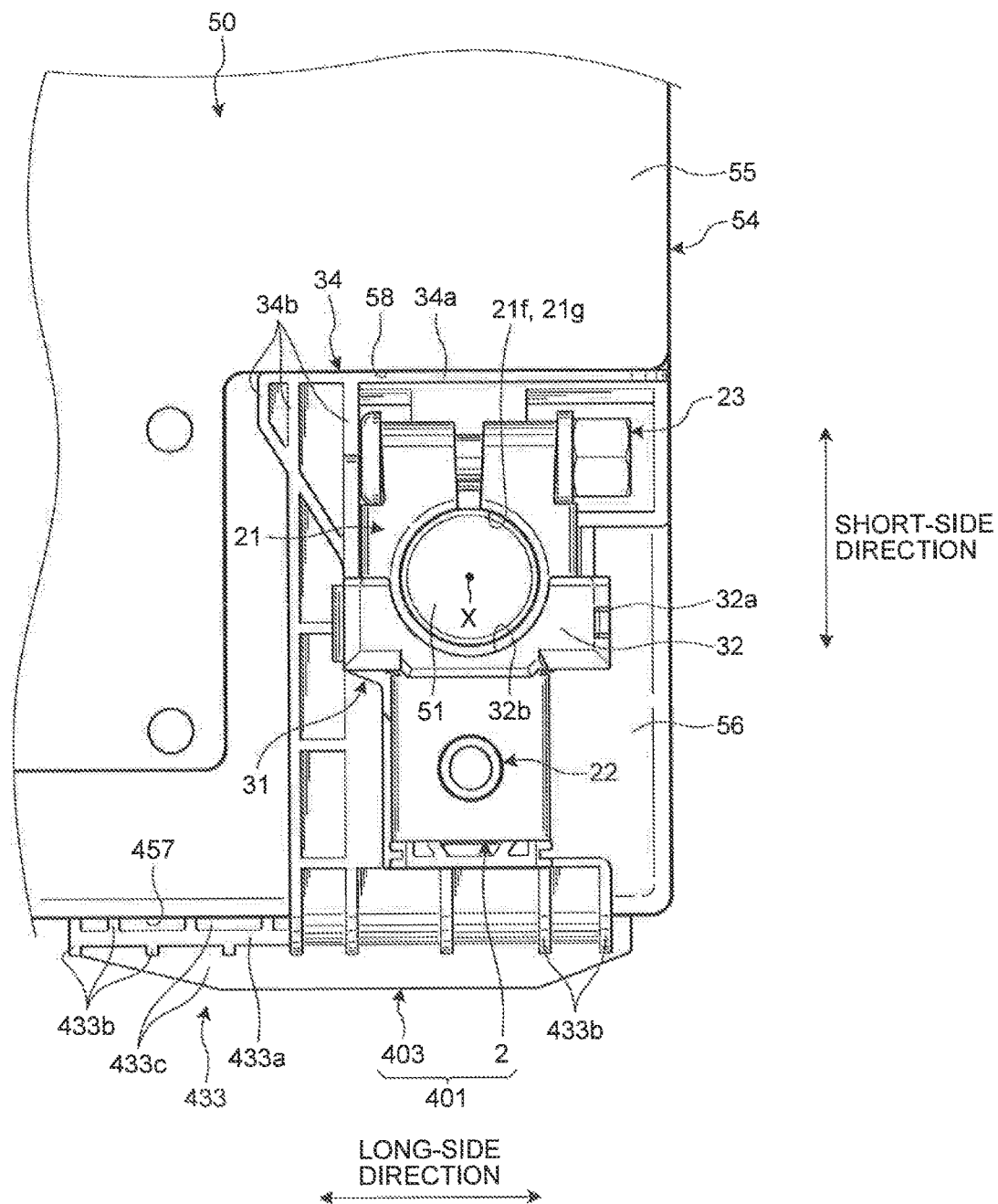
FIG. 15 is a partial plan view illustrating the schematic configuration of a battery terminal unit according to another modification.

The battery terminal unit 401 according to the modification as illustrated in FIG. 15 includes the battery terminal 2 and a battery terminal stopper 403. The battery terminal stopper 403 in the modification includes the attachment portion 31, the lid portion 32, a first rotation preventing portion 433, and the second rotation preventing portion 34. The first rotation preventing portion 433 has substantially the same configuration as the above-mentioned second rotation preventing portion 234 (see FIG. 11). A first abutment surface 457 has substantially the same configuration as the second abutment surface 258 (see FIG. 11). The second abutment surface 58 against which the second rotation preventing portion 34 in the modification abuts is formed on the surface of the battery housing 52 that is different from the first abutment surface 457.

The first rotation preventing portion 433 is provided on the attachment portion 31. The first rotation preventing portion 433 is formed at a position opposing the first abutment surface 457 formed on the battery housing 52 in the assembled state. The first abutment surface 457 is formed on the surface of the battery housing 52 that is different from the second abutment surface 58. The first abutment surface 457 in the modification is formed on the side surface of the battery housing 52 that is parallel with the second abutment surface 58, in this example, on the side surface along the long-side direction in the vicinity of the recess 56 formed on the post stand surface 55 of the lid member 54. The first rotation preventing portion 433 abuts against the first abutment surface 457 in the assembled state so as to restrict rotation of the battery terminal 2 around the axial direction about the center axis line X of the battery post 51 as the rotating center.

To be more specific, the first rotation preventing portion 433 is provided to extend from the attachment portion 31, and includes a plate-like portion 433a opposing the first abutment surface 457 in the assembled state, and a plurality of longitudinal ribs 433b and a plurality of transverse ribs 433c for reinforcing the plate-like portion 433a. The plate-like portion 433a is formed into a plate form along the long-side direction. The plate-like portion 433a, the longitudinal ribs 433b, and the transverse ribs 433c have substantially the same configurations as the plate-like portion 234a (see FIG. 11), the longitudinal ribs 234b (see FIG. 11), and the transverse ribs 234c (see FIG. 11), respectively. The plane including the front end surfaces (contact surfaces) of the longitudinal ribs 433b and the transverse ribs 433c formed on the opposing surface of the plate-like portion 433a that opposes the first abutment surface 457 are substantially parallel with the plane including the opposing surface (contact surface) of the plate-like portion 34a of the second rotation preventing portion 34. That is to say, the first rotation preventing portion 433 and the second rotation preventing portion 34 are substantially parallel with each other when seen from the above as illustrated in FIG. 15.

Figure 16:
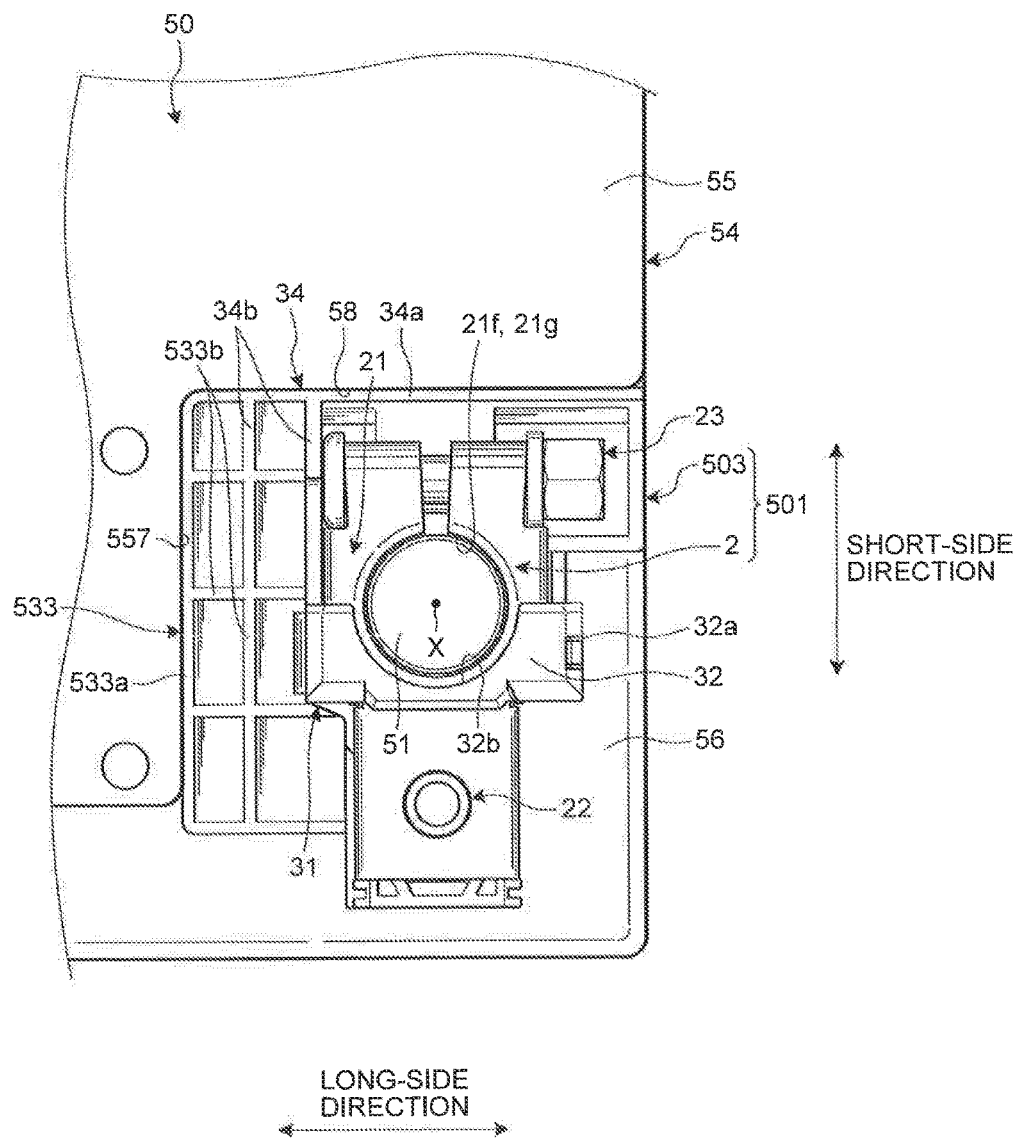
FIG. 16 is a partial plan view illustrating the schematic configuration of a battery terminal unit according to still another modification.

The battery terminal unit 501 according to the modification illustrated in FIG. 16 includes the battery terminal 2 and a battery terminal stopper 503. The battery terminal stopper 503 in the modification includes the attachment portion 31, the lid portion 32, a first rotation preventing portion 533, and the second rotation preventing portion 34. The first rotation preventing portion 533 has substantially the same configuration as the above-mentioned second rotation preventing portion 334 (see FIG. 14). Furthermore, a first abutment surface 557 against which the first rotation preventing portion 533 abuts has substantially the same configuration as the above-mentioned second abutment surface 358 (see FIG. 14). The second abutment surface 58 against which the second rotation preventing portion 34 in the modification abuts is formed on the surface of the battery housing 52 that is different from the first abutment surface 557.

The first rotation preventing portion 533 is provided on the attachment portion 31. The first rotation preventing portion 533 is formed at a position opposing the first abutment surface 557 formed on the battery housing 52 in the assembled state. The first abutment surface 557 is formed on the surface of the battery housing 52 that is different from the second abutment surface 58. The first abutment surface 557 in the modification is formed on the wall surface of the recess 56 formed on the post stand surface 55 of the lid member 54 in the battery housing 52, the wall surface being orthogonal to the wall surface of the recess 56 on which the second abutment surface 58 is formed. That is to say, the first abutment surface 557 is formed on the wall surface defining the recess 56 formed into a substantially rectangular shape, the wall surface being along the short-side direction. The first rotation preventing portion 533 abuts against the first abutment surface 557 in the assembled state so as to restrict the rotation of the battery terminal 2 around the axial direction about the battery post 51 as the rotating center.

To be more specific, the first rotation preventing portion 533 is provided to extend from the attachment portion 31, and includes a plate-like portion 533a opposing the first abutment surface 557 in the assembled state and a plurality of coupling ribs 533b coupling the plate-like portion 533a to the attachment portion 31. The plate-like portion 533a and the coupling ribs 533b have substantially the same configurations as the plate-like portion 334a (see FIG. 14) and the coupling ribs 334b (see FIG. 1.4), respectively. Some of the coupling ribs 533b also serve as the coupling ribs 34b. The plane including the opposing surface (contact surface) of the plate-like portion 533a is substantially orthogonal to the plane including the opposing surface (contact surface) of the plate-like portion 34a of the second rotation preventing portion 34. That is to say, the first rotation preventing portion 533 and the second rotation preventing portion 34 intersect with each other in a substantially L-shaped form when seen from the above as illustrated in FIG. 16.

Figure 17:
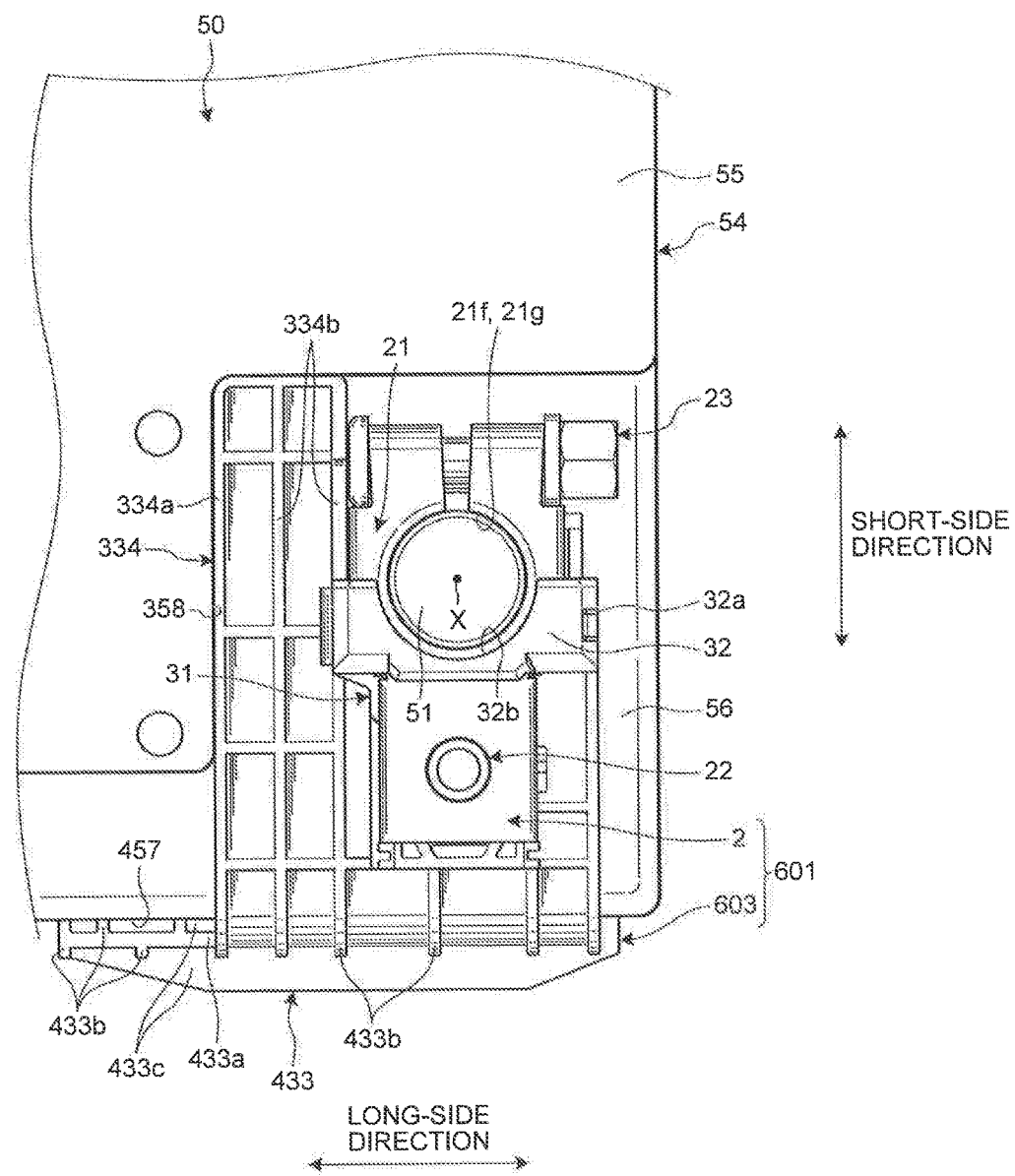
FIG. 17 is a partial plan view illustrating the schematic configuration of a battery terminal unit according to still another modification.

The battery terminal unit 601 according to the modification illustrated in FIG. 17 includes the battery terminal 2 and a battery terminal stopper 603. The battery terminal stopper 603 in the modification includes the attachment portion 31, the lid portion 32, the first rotation preventing portion 433, and the second rotation preventing portion 334. The first rotation preventing portion 433 and the first abutment surface 457 against which the first rotation preventing portion 433 abuts have substantially the same configurations as those in FIG. 15. The second rotation preventing portion 334 and the second abutment surface 358 against which the second rotation preventing portion 334 abuts have substantially the same configurations as those in FIG. 14. The second abutment surface 358 in the modification is formed on the surface of the battery housing 52 that is different from the first abutment surface 457. The first abutment surface 457 is formed on the side surface of the battery housing 52 along the long-side direction of the lid member 54, and the second abutment surface 358 is formed on the battery housing 52 along the direction intersecting with the first abutment surface 457. To be more specific, the second abutment surface 358 is formed on the wall surface of the recess 56 formed on the post stand surface 55 of the lid member 54 on which the battery post 51 is provided upright in the battery housing 52, the wall surface being orthogonal to the side surface of the battery housing 52 on which the first abutment surface 457 is formed. The first rotation preventing portion 433 and the second rotation preventing portion 334 in the modification intersect with each other in a substantially T-shaped form when seen from the above as illustrated in FIG. 17.

With any of the battery terminal stopper and the battery terminal unit according to the embodiments and the modifications described above, the allowable range of the assembled angle of the battery terminal 2 with respect to the battery post 51 can be limited to the relatively narrow range, thereby improving the assembling accuracy of the battery terminal 2 on the battery post 51.

In the battery terminal stopper and the battery terminal unit according to the invention, the first rotation preventing portion abuts against the first abutment surface of the battery housing so as to restrict rotation of the battery terminal or the second rotation preventing portion abuts against the second abutment surface of the battery housing so as to restrict the rotation of the battery terminal. This can limit the allowable range of the assembled angle of the battery terminal with respect to the battery post to the relatively narrow range, thereby achieving an effect that the assembling accuracy of the battery terminal on the battery post.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A battery terminal stopper comprising:
   an attachment portion separate from and capable of being attached to a battery terminal at a lower side thereof in a lamination direction and having a post insertion hole into which a battery post is inserted, the battery terminal including a main body portion and a stud bolt and being assembled on the battery post provided on a battery housing;
   a first rotation preventing portion that is configured to be provided on the attachment portion, opposes a first abutment surface formed on a side surface of the battery housing, and abuts against the first abutment surface in a state where the battery terminal is assembled on the battery post together with the attachment portion so as to be able to restrict rotation of the battery terminal about the battery post as a rotating center; and
   a second rotation preventing portion that is configured to be provided on the attachment portion, opposes a second abutment surface formed on the battery housing along a direction intersecting with the first abutment surface, and abuts against the second abutment surface in the state where the battery terminal is assembled on the battery post together with the attachment portion so as to be able to restrict rotation of the battery terminal about the battery post as the rotating center.

2. The battery terminal stopper according to claim 1, wherein
   the second abutment surface is formed on a wall surface of a recess that is formed on a post stand surface provided with the battery post and on which the battery post is provided upright in the battery housing, the wall surface being orthogonal to the side surface of the battery housing on which the first abutment surface is formed.

3. The battery terminal stopper according to claim 2, wherein
   the first rotation preventing portion and the second rotation preventing portion are formed integrally with the attachment portion, and
   the attachment portion is interposed between the battery terminal and the battery housing in a state where the battery terminal is assembled on the battery post together with the attachment portion.

4. The battery terminal stopper according to claim 1, wherein
   the second abutment surface is formed on a side surface of the battery housing that is orthogonal to the side surface of the battery housing on which the first abutment surface is formed.

5. The battery terminal stopper according to claim 4, wherein
   the first rotation preventing portion and the second rotation preventing portion are formed integrally with the attachment portion, and
   the attachment portion is interposed between the battery terminal and the battery housing in a state where the battery terminal is assembled on the battery post together with the attachment portion.

6. The battery terminal stopper according to claim 1, wherein
   the first rotation preventing portion and the second rotation preventing portion are formed integrally with the attachment portion, and
   the attachment portion is interposed between the battery terminal and the battery housing in a state where the battery terminal is assembled on the battery post together with the attachment portion.

7. The battery terminal stopper according to claim 1, wherein
   the first rotation preventing portion includes a plate-like portion opposing the first abutment surface, and the plate-like portion extends to a position beyond a wall surface defining a recess and crosses a corner formed by the first abutment surface and the second abutment surface.

8. The battery terminal stopper according to claim 7, wherein
   the plate-like portion includes a plurality of longitudinal ribs and a plurality of transverse ribs for reinforcing the plate-like portion.

9. The battery terminal stopper according to claim 8, wherein
   a height of the transverse ribs decreases gradually toward both
   end sides of the transverse ribs.

10. A battery terminal unit comprising:
    a battery terminal including a main body portion and a stud bolt and configured to be assembled on a battery post provided on a battery housing; and
    a battery terminal stopper configured to include an attachment portion separate from and capable of being attached to the battery terminal at a lower side thereof in a lamination direction and having a post insertion hole into which the battery post is inserted, a first rotation preventing portion that is provided on the attachment portion, opposes a first abutment surface formed on a side surface of the battery housing and abuts against the first abutment surface in a state where the battery terminal is assembled on the battery post together with the attachment portion so as to be able to restrict rotation of the battery terminal about the battery post as a rotating center, and a second rotation preventing portion that is provided on the attachment portion, opposes a second abutment surface formed on the battery housing along a direction intersecting with the first abutment surface and abuts against the second abutment surface in the state where the battery terminal is assembled on the battery post together with the attachment portion so as to be able to restrict rotation of the battery terminal about the battery post as the rotating center.

* * * * *